(12) United States Patent
C H et al.

(10) Patent No.: US 11,522,797 B2
(45) Date of Patent: Dec. 6, 2022

(54) METHOD AND SYSTEM FOR TRACING PACKETS IN SOFTWARE DEFINED NETWORKS

(71) Applicant: Telefonaktiebolaget LM Ericsson (publ), Stockholm (SE)

(72) Inventors: Vyshakh Krishnan C H, Bangalore (IN); Faseela K, Bengaluru (IN); Joel Halpern, Leesburg, VA (US)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 41 days.

(21) Appl. No.: 16/635,985

(22) PCT Filed: Aug. 30, 2017

(86) PCT No.: PCT/IB2017/055228
§ 371 (c)(1),
(2) Date: Jan. 31, 2020

(87) PCT Pub. No.: WO2019/043435
PCT Pub. Date: Mar. 7, 2019

(65) Prior Publication Data
US 2021/0144091 A1     May 13, 2021

(51) Int. Cl.
*H04L 45/74* (2022.01)
*G06F 9/455* (2018.01)
(Continued)

(52) U.S. Cl.
CPC ........ *H04L 45/742* (2013.01); *G06F 9/45558* (2013.01); *H04L 41/0893* (2013.01); *H04L 45/745* (2013.01); *G06F 2009/45595* (2013.01)

(58) Field of Classification Search
CPC . H04L 45/742; H04L 45/745; H04L 41/0893; H04L 12/4641; H04L 67/00; G06F 9/45558; G06F 2009/45595
See application file for complete search history.

(56) References Cited

U.S. PATENT DOCUMENTS

| 8,561,025 | B1 | 10/2013 | Bisht et al. |
| 11,095,497 | B2 | 8/2021 | Bisht et al. |

(Continued)

FOREIGN PATENT DOCUMENTS

| CN | 105791129 A | 7/2016 |
| WO | 2016/114750 A1 | 7/2016 |

(Continued)

OTHER PUBLICATIONS

Handigol, et al., "Where is the Debugger for my Software Defined Network?," ACM, HotSDN'12, Aug. 13, 2012, Helsinki, Finland, 6 pages.

(Continued)

*Primary Examiner* — Pankaj Kumar
*Assistant Examiner* — Eric V. Phu
(74) *Attorney, Agent, or Firm* — Nicholson, De Vos, Webster & Elliott, LLP

(57) ABSTRACT

A method is implemented by a network device where the method performs a trace flow process in a packet processing pipeline of the network device. The packet processing pipeline includes a trace table and a forward table. The method encompasses forwarding a trace packet to the trace table, forwarding a copy of the trace packet to a trace analyzer in response to determining that a trace bit is set in the trace packet, forwarding the trace packet to the forward table, and determining a next stage of the packet processing pipeline based on trace packet meta data and a value stored in a trace register.

17 Claims, 10 Drawing Sheets

(51) Int. Cl.
H04L 41/0893 (2022.01)
H04L 45/745 (2022.01)

(56) References Cited

U.S. PATENT DOCUMENTS

| | | |
|---|---|---|
| 2001/0037465 A1 | 11/2001 | Hart et al. |
| 2004/0049596 A1 | 3/2004 | Schuehler et al. |
| 2006/0022818 A1 | 2/2006 | Piltonen |
| 2008/0126877 A1 | 5/2008 | Alsup |
| 2009/0254468 A1 | 10/2009 | Acedo et al. |
| 2009/0292994 A1 | 11/2009 | Lwo |
| 2010/0005151 A1 | 1/2010 | Gokhale |
| 2011/0125892 A1 | 5/2011 | Rajan et al. |
| 2013/0176888 A1 | 7/2013 | Kubota et al. |
| 2013/0290639 A1 | 10/2013 | Tran et al. |
| 2013/0304915 A1 | 11/2013 | Kawai |
| 2014/0241356 A1 | 8/2014 | Zhang et al. |
| 2014/0286342 A1 | 9/2014 | Xia et al. |
| 2014/0301213 A1 | 10/2014 | Khanal et al. |
| 2015/0016286 A1 | 1/2015 | Ganichev et al. |
| 2015/0016298 A1* | 1/2015 | Ganichev ............ H04L 43/10 370/253 |
| 2015/0088823 A1 | 3/2015 | Chen et al. |
| 2015/0113132 A1 | 4/2015 | Srinivas et al. |
| 2015/0127805 A1 | 5/2015 | Htay et al. |
| 2015/0139238 A1 | 5/2015 | Pourzandi et al. |
| 2015/0172189 A1 | 6/2015 | Pitchai et al. |
| 2015/0256397 A1 | 9/2015 | Agarwal |
| 2015/0281036 A1 | 10/2015 | Sun et al. |
| 2015/0334045 A1 | 11/2015 | Tremblay et al. |
| 2016/0050131 A1 | 2/2016 | Zhang et al. |
| 2016/0105267 A1 | 4/2016 | Verplanken et al. |
| 2016/0112328 A1 | 4/2016 | Anand |
| 2016/0142291 A1 | 5/2016 | Polland |
| 2016/0142301 A1 | 5/2016 | Anand |
| 2016/0226578 A1 | 8/2016 | Yuan et al. |
| 2016/0227598 A1 | 8/2016 | Singh |
| 2016/0234068 A1 | 8/2016 | Dolganow et al. |
| 2016/0274976 A1 | 9/2016 | Manjunath et al. |
| 2016/0301601 A1 | 10/2016 | Anand et al. |
| 2016/0380874 A1 | 12/2016 | Sun et al. |
| 2017/0019152 A1 | 1/2017 | Kim et al. |
| 2017/0068684 A1 | 3/2017 | Hahn |
| 2017/0155574 A1 | 6/2017 | Mullin et al. |
| 2018/0063072 A1 | 3/2018 | Wackerly et al. |
| 2018/0115466 A1 | 4/2018 | Kazemian et al. |
| 2018/0227209 A1 | 8/2018 | Lin |
| 2018/0287932 A1 | 10/2018 | Viquez et al. |
| 2019/0229977 A1 | 7/2019 | Bisht et al. |
| 2020/0344143 A1 | 10/2020 | K et al. |

FOREIGN PATENT DOCUMENTS

| | | |
|---|---|---|
| WO | 2017/118875 A1 | 7/2017 |
| WO | 2018/046988 A1 | 3/2018 |
| WO | 2018/203108 A1 | 11/2018 |
| WO | 2019/043435 A1 | 3/2019 |
| WO | 2019/239190 A1 | 12/2019 |

OTHER PUBLICATIONS

Open Networking Foundation, "OpenFlow Switch Specification," V 1.5.0 (protocol version 0x06), ONF TS-020, Dec. 19, 2014, pp. 1-277.

Zhi, et al., "MED: The Monitor-Emulator-Debugger for Software-Defined Networks", IEEE INFOCOM 2016—The 35th Annual IEEE International Conference on Computer Communications, IEEE, Apr. 10, 2016, 9 pages.

Eichelberger, et al., "SFC Path Tracer: A Troubleshooting Tool for Service Function Chaining", IFIP/IEEE International Symposium on Integrated Network Management (IM2017), 2017, pp. 568-571.

Kawai, et al., "Per-Flow Entry Verification for Legacy SDN", The 22nd Asia-Pacific Conference on Communications (APCC2016), IEEE, Aug. 2016, pp. 502-510.

\* cited by examiner

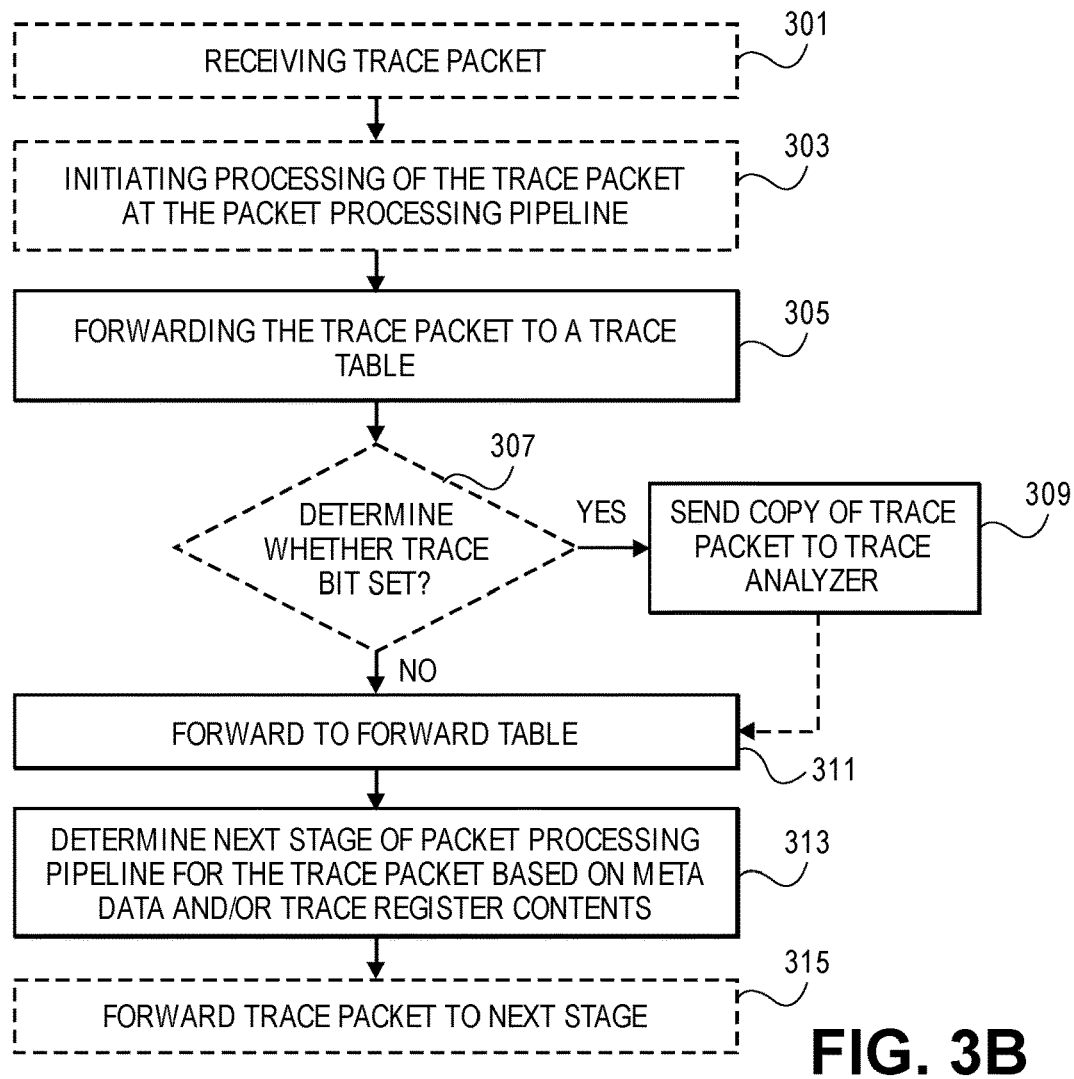

METHOD AND SYSTEM FOR TRACING PACKETS IN SOFTWARE DEFINED NETWORKS

CROSS-REFERENCE TO RELATED APPLICATIONS

This application is a national stage of International Application No. PCT/IB2017/055228, filed Aug. 30, 2017, which is hereby incorporated by reference.

TECHNICAL FIELD

Embodiments of the invention relate to the field of packet tracing; and more specifically, to a method and system for packet tracing in software defined networks.

BACKGROUND

Software defined networking (SDN) technology is an approach to computer networking architecture that shifts administration and configuration of nodes in a network to a controller. The control plane operations are minimized at individualized nodes in the network, which enables the nodes to be more easily updated and places control plane decisions at a controller. The controller or set of controllers for an SDN network communicate with and configure the nodes of the SDN network that implement the data plane functions via a flow control protocol such as OpenFlow or similar protocols. The use of SDN networks facilitates rapid and open innovation at the network layer by providing a programmable network infrastructure. The flow control protocols standardize and enable dynamic programming of flow control policies in the SDN network.

Each node or logical switch in the SDN network that implements the data plane functions of SDN has a packet processing pipeline containing one or more flow tables. Each flow table contains multiple flow entries where each flow entry contains match-and-action instructions. These flow entries are configured by the controller and define the operation of the node as it receives, processes and forwards data packets.

The flow tables of a given node are numbered or similarly ordered with regard to the traversal by received data packets, e.g., the initial flow table may be enumerated starting at 0. Pipeline processing can start at the first flow table where a received data packet is first matched against flow entries of flow table 0. Other flow tables may be used depending on the outcome of the match (and corresponding action) in the first table. The define actions of a flow table entry may identify other flow tables to be matched against in addition to other actions to be taken with regard to a received data packet. In this way, a data packet can traverse multiple flow tables and be matched against the entries of each of these flow tables where any match may cause the associated actions to be carried out by the packet processing pipeline until the processing completes and the data packet is forwarded toward a next destination in the SDN network. The traversal of an arbitrary number of flow tables at each node in the SDN network complicates trouble shooting in cases where a data packet is not properly processed or does not reach its target destination. Identifying the node or flow table where an error occurs can therefore be difficult and labor intensive to determine.

SUMMARY

In one embodiment, a method is implemented by a network device where the method performs a trace flow process in a packet processing pipeline of the network device. The packet processing pipeline includes a trace table and a forward table. The method encompasses forwarding a trace packet to the trace table, forwarding a copy of the trace packet to a trace analyzer in response to determining that a trace bit is set in the trace packet, forwarding the trace packet to the forward table, and determining a next stage of the packet processing pipeline based on trace packet meta data and a value stored in a trace register.

In another embodiment, a network device is configured to implement a method to perform a trace flow process in a packet processing pipeline of the network device. The network device includes a non-transitory machine-readable storage medium having stored therein a set of flow table entries configured to implement a trace flow, and a processor to execute a packet processing pipeline including a trace table and a forward table. The processor is configured to execute the trace flow by forwarding a trace packet to the trace table, to forward a copy of the trace packet to a trace analyzer in response to determining that a trace bit is set in the trace packet, to forward the trace packet to the forward table, and to determine a next stage of the packet processing pipeline based on trace packet meta data and a value stored in a trace register.

In one embodiment, a computing device is configured to execute a plurality of virtual machines. The plurality of virtual machines is configured to provide network function virtualization (NFV). The plurality of virtual machines implements a method to perform a trace flow process in a packet processing pipeline of the computing device. The computing device includes a non-transitory machine-readable storage medium having stored therein a set of flow table entries configured to implement a trace flow and a processor to execute the plurality of virtual machines. At least one virtual machine in the plurality of virtual machines is configured to execute a packet processing pipeline including a trace table and a forward table, the at least one virtual machine is further configured to execute the trace flow by forwarding a trace packet to the trace table, to forward a copy of the trace packet to a trace analyzer in response to determining that a trace bit is set in the trace packet, to forward the trace packet to the forward table, and to determine a next stage of the packet processing pipeline based on trace packet meta data and a value stored in a trace register.

In a further embodiment, a control plane device is configured to implement a method to manage a trace flow process in a packet processing pipeline of a network device, the control plane device includes a non-transitory machine-readable storage medium having stored therein a set of flow table entries configured to implement a trace analyzer, and a processor coupled to the non-transitory machine-readable storage medium, the processor to execute the trace analyzer, the trace analyzer to receive at least one trace packet copy from a trace table of a set of nodes in the data plane of a software defined network, the trace analyzer to determine a trace path within a packet processing pipeline based on a collection of the at least one packet copy.

BRIEF DESCRIPTION OF THE DRAWINGS

The invention may best be understood by referring to the following description and accompanying drawings that are used to illustrate embodiments of the invention. In the drawings:

FIG. 3B is a flowchart of one embodiment of the process of trace data packet handling.

FIG. 3C is a flowchart of one embodiment of the process of packet processing pipeline modification.

DETAILED DESCRIPTION

Figure 1:
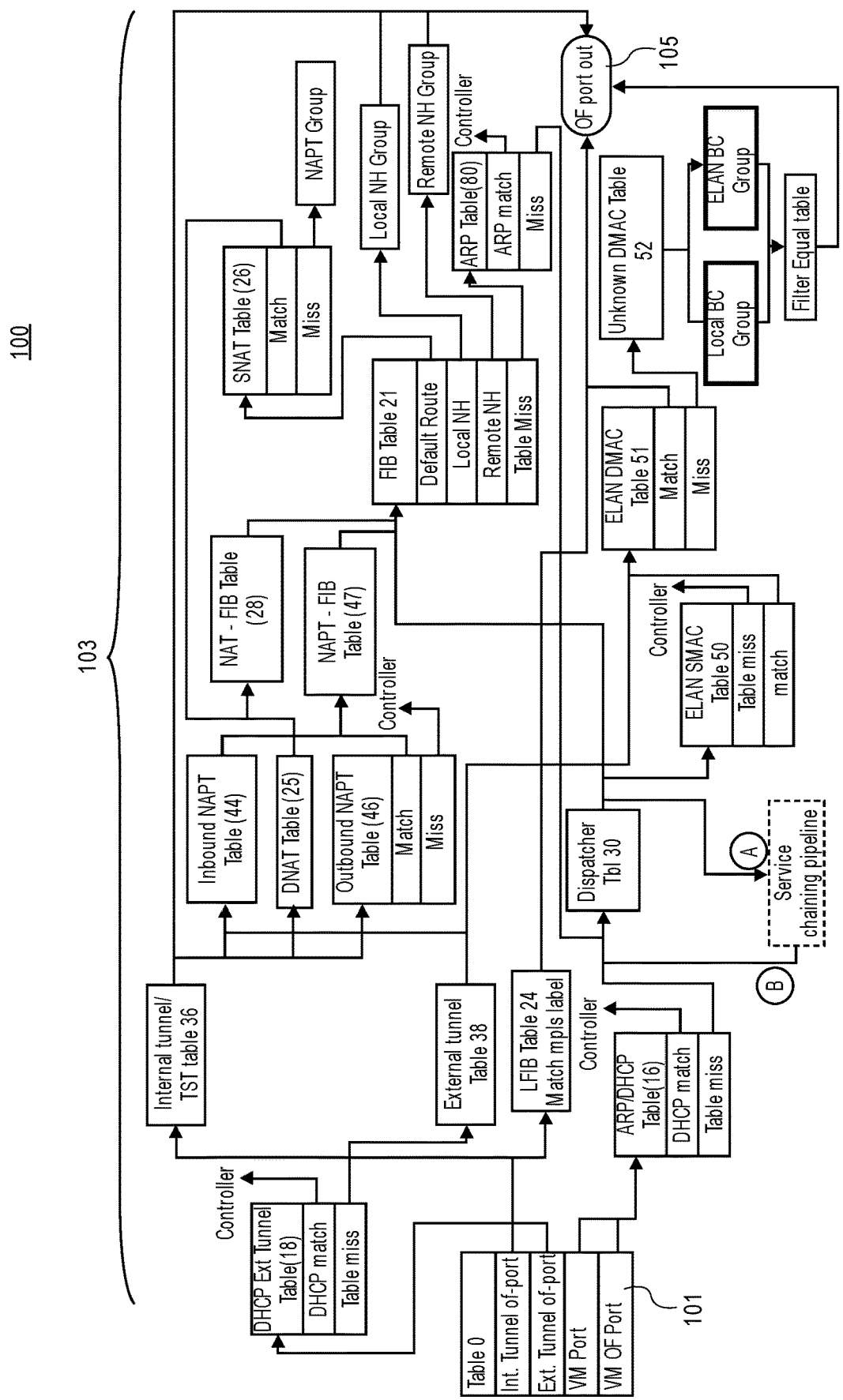
FIG. 1 is a diagram of one embodiment of an example packet processing pipeline within a networking device in an SDN.

The following description describes methods and apparatus for tracing a path of a data packet through a packet processing pipeline of a data plane node in a software defined networking (SDN) network. The flow control tables and groups in the pipeline are modified to forward each data packet through a trace and forward table that capture the state of the packet after each table is traversed and report this state to the controller or a trace analyzer component to enable the compilation of a trace of the data packet. The process can utilize generated trace packets or marked live data traffic.

In the following description, numerous specific details such as logic implementations, opcodes, means to specify operands, resource partitioning/sharing/duplication implementations, types and interrelationships of system components, and logic partitioning/integration choices are set forth in order to provide a more thorough understanding of the present invention. It will be appreciated, however, by one skilled in the art that the invention may be practiced without such specific details. In other instances, control structures, gate level circuits and full software instruction sequences have not been shown in detail in order not to obscure the invention. Those of ordinary skill in the art, with the included descriptions, will be able to implement appropriate functionality without undue experimentation.

References in the specification to "one embodiment," "an embodiment," "an example embodiment," etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described.

Bracketed text and blocks with dashed borders (e.g., large dashes, small dashes, dot-dash, and dots) may be used herein to illustrate optional operations that add additional features to embodiments of the invention. However, such notation should not be taken to mean that these are the only options or optional operations, and/or that blocks with solid borders are not optional in certain embodiments of the invention.

In the following description and claims, the terms "coupled" and "connected," along with their derivatives, may be used. It should be understood that these terms are not intended as synonyms for each other. "Coupled" is used to indicate that two or more elements, which may or may not be in direct physical or electrical contact with each other, co-operate or interact with each other. "Connected" is used to indicate the establishment of communication between two or more elements that are coupled with each other.

An electronic device stores and transmits (internally and/or with other electronic devices over a network) code (which is composed of software instructions and which is sometimes referred to as computer program code or a computer program) and/or data using machine-readable media (also called computer-readable media), such as machine-readable storage media (e.g., magnetic disks, optical disks, solid state drives, read only memory (ROM), flash memory devices, phase change memory) and machine-readable transmission media (also called a carrier) (e.g., electrical, optical, radio, acoustical or other form of propagated signals—such as carrier waves, infrared signals). Thus, an electronic device (e.g., a computer) includes hardware and software, such as a set of one or more processors (e.g., wherein a processor is a microprocessor, controller, microcontroller, central processing unit, digital signal processor, application specific integrated circuit, field programmable gate array, other electronic circuitry, a combination of one or more of the preceding) coupled to one or more machine-readable storage media to store code for execution on the set of processors and/or to store data. For instance, an electronic device may include non-volatile memory containing the code since the non-volatile memory can persist code/data even when the electronic device is turned off (when power is removed), and while the electronic device is turned on that part of the code that is to be executed by the processor(s) of that electronic device is typically copied from the slower non-volatile memory into volatile memory (e.g., dynamic random access memory (DRAM), static random access memory (SRAM)) of that electronic device. Typical electronic devices also include a set or one or more physical network interface(s) (NI(s)) to establish network connections (to transmit and/or receive code and/or data using propagating signals) with other electronic devices. For example, the set of physical NIs (or the set of physical NI(s) in combination with the set of processors executing code) may perform any formatting, coding, or translating to allow the electronic device to send and receive data whether over a wired and/or a wireless connection. In some embodiments, a physical NI may comprise radio circuitry capable of receiving data from other electronic devices over a wireless connection and/or sending data out to other devices via a wireless connection. This radio circuitry may include transmitter(s), receiver(s), and/or transceiver(s) suitable for radiofrequency communication. The radio circuitry may convert digital data into a radio signal having the appropriate parameters (e.g., frequency, timing, channel, bandwidth, etc.). The radio signal may then be transmitted via antennas to the appropriate recipient(s). In some embodiments, the set of physical NI(s) may comprise network interface controller(s) (NICs), also known as a network interface card, network adapter, or local area network (LAN) adapter. The NIC(s) may facilitate in connecting the electronic device to other electronic devices allowing them to communicate via wire through plugging in a cable to a physical port connected to a NIC. One or more parts of an embodiment of the invention may be implemented using different combinations of software, firmware, and/or hardware.

A network device (ND) is an electronic device that communicatively interconnects other electronic devices on the network (e.g., other network devices, end-user devices). Some network devices are "multiple services network devices" that provide support for multiple networking functions (e.g., routing, bridging, switching, Layer 2 aggregation, session border control, Quality of Service, and/or subscriber management), and/or provide support for multiple application services (e.g., data, voice, and video).

Overview

Flow control protocols are utilized in Software Defined Networking (SDN) to manage the control plane of the network thereby removing complexity of the control plane functions from nodes in the network and placing this functionality in a controller with greater resources availability and more easily and cost effectively upgraded. However, the data plane nodes still have data plane responsibilities and functions that are implemented as part of a packet processing pipeline. As SDN and flow control protocols have progressed the packet processing pipeline has become increasing complex. The packet processing pipeline can include a set of flow tables that are utilized to implement the packet processing. The flow tables are populated by the SDN controller based on various network information and to handle various network events.

With this increasing packet processing pipeline complexity, and increases in the scale of functions that the flow control protocols and data plane nodes supports, when a packet is not properly processed (i.e., the packet does not go through its intended packet processing path), it becomes extremely difficult to troubleshoot. A sample rules dump (e.g., where the flow control protocol is the OpenFlow protocol) may look like:

stack@osc-1:~/devstack$ sudo ovs-ofctl dump-flows br-int-OOpenflow13
OFPST_FLOW reply (OF1.3) (xid=0x2):
cookie=0x8000000, duration=860.913s, table=0, n_packets=77, n_bytes=6784, priority=4,in_port=1 actions=write_metadata:0x60000000000/0xffffff0000000000,goto_table:16
cookie=0x8000000, duration=815.606s, table=0, n_packets=72, n_bytes=6462, priority=4,in_port=2 actions=write_metadata:0x80000000000/0xffffff0000000000,goto_table:16
cookie=0x100000, duration=998.357s, table=0, n_packets=0, n_bytes=0, priority=0 actions=goto_table:80
cookie=0x1100000, duration=998.357s, table=10, n_packets=0, n_bytes=0, priority=0 actions=goto_table:11
cookie=0x6800000, duration=860.795s, table=16, n_packets=2, n_bytes=674, priority=50,udp,dl_src=fa:16:3e:45:ea:2e,tp_src=68,tp_dst=67 actions=write actions (CONTROLLER:65535
cookie=0x6800000, duration=815.516s, table=16, n_packets=2, n_bytes=674, priority=50,udp,dl_src=fa:16:3e:09:78:b4,tp_src=68,tp_dst=67 actions=write actions (CONTROLLER:65535
cookie=0x6800000, duration=998.356s, table=16, n_packets=145, n_bytes=11898, priority=0 actions=goto_table:17
cookie=0x8040000, duration=44.137s, table=17, n_packets=0, n_bytes=0, priority=3, metadata=0x6000060000000000/0xffffff0000000000 actions=write_metadata:0x800006138a000000,goto_table:50
cookie=0x8000001, duration=44.137s, table=17, n_packets=40, n_bytes=3808, priority=2, metadata=0x60000000000/0xffffff0000000000 actions=write_metadata:0x6000060000000066,goto_table:21
cookie=0x8040000, duration=41.156s, table=17, n_packets=0, n_bytes=0, priority=3, metadata=0x6000080000000000/0xffffff0000000000 actions=write_metadata:0x800008138b000000,goto_table:50
cookie=0x8110006, duration=44.326s, table=80, n_packets=2, n_bytes=84, priority=100,arp, metadata=0x6000060000000066/0xffffff00ffffffff,arp_op=1 actions=CONTROLLER:6553
cookie=0x8110006, duration=44.320s, table=80, n_packets=0, n_bytes=0, priority=100,arp, metadata=0x6000060000000066/0xffffff00ffffffff,arp_op=2 actions=CONTROLLER:65535
cookie=0x8110008, duration=41.641s, table=80, n_packets=5, n_bytes=210, priority=100,arp, metadata=0x6000080000000066/0xffffff00ffffffff,arp_op=1 actions=CONTROLLER:65535
cookie=0x8110008, duration=41.638s, table=80, n_packets=0, n_bytes=0, priority=100,arp, metadata=0x6000080000000066/0xffffff00ffffffff,arp_op=2 actions=CONTROLLER:65535
cookie=0x1030000, duration=998.356s, table=80, n_packets=0, n_bytes=0, priority=0 actions=resubmit(,17)
stack@osc-1:~/devstack$ sudo ovs-ofctl dump-groups br-int-OOpenflow13
OFPST_GROUP_DESC reply (OF1.3) (xid=0x2)
group_id=150001,type=all,bucket=actions=set_field:fa:16:3e:45:ea:2e→eth_dst,output:1
group_id=150000,type=all,bucket=actions=set_field:fa:16:3e:09:78:b4→eth_dst,output:2
group_id=210003,type=all,bucket=actions=set_field:0x6→tun_id,resubmit(,55)
group_id=210005,type=all,bucket=actions=set_field:0x8→tun_id,resubmit(,55)
stack@osc-1:~/devstack$ When the SDN controller configures a data plane node, e.g., installs a service at the node, the configuration forms a small part of a large packet processing pipeline such that there was no way to ensure that the installed configuration (e.g., a service pipeline) is proper and flow are operating or installed properly. For example, if the data plane node is configured with an L3 router service, which connects subnets 10.1.1.1/24 and 20.1.1.1/24, there is no way to see if the L3 flows are operating properly. The embodiments address this issue to enable proper troubleshooting.

In some embodiments, the embodiments utilize a mechanism for tracing the data packet path in the flow control (e.g., OpenFlow) by sending a copy of the data packet from each flow table to an external monitoring system (e.g., at the SDN controller) based on a detection of a trace bit that is set in the data packet. But this use of a trace bit has limitations. The use of the trace bit in data traffic to trace the flow and analyze the packet processing pipeline relies on real traffic (with the trace bit set) to a particular destination to be sent to the data plane node and processed by the packet processing pipeline. Also, even if there are some problems with these data flows and it can be identified with the real data traffic this will occur in real time and continue until the time the service can be reprogrammed to properly handle the data flows, until such time traffic drop will happen. In addition, the use of the trace bit in data packets only traces flow tables and doesn't have the capability to trace groups. In many packet processing pipelines, debugging becomes more difficult with groups and the trace bit mechanism by itself does not address this issue.

The embodiments address and overcome these limitations of the trace bit mechanism as well as the prior art that did not provide a troubleshooting mechanism for packet processing pipelines in data plane nodes of an SDN network. The embodiments provide an efficient mechanism to find the data flows for data traffic programmed for a particular destination, i.e., the data flows that are traversed when a data packet to a particular destination enters the packet processing pipeline of a data plane node in the SDN network. The embodiments can trace the data flows across multiple data plane nodes (i.e., logical switches) connected to same controller and/or part of the same SDN network. The embodiments may use a trace bit where the process sets one bit in metadata field and may also use at least one packet register at each data plane node to indicate when a data packet needs to be traced. Sample data packets are formed in the controller for a particular destination (e.g., for a destination Internet Protocol (IP) address, media access control (MAC) address or similar destination) and sent to the data plane node (e.g., specifically to table 0 of a logical switch with trace bit set).

In some embodiments, additional tables, the trace table and forward table, are introduced. The trace table is used to check for a trace bit and punts (i.e., forwards) a copy of the data packet with the trace bit set to the controller. Using this table, data traffic is differentiated to identify traced data packets based on whether the trace bit is set. The forward table is used to forward the data packets being traced to a next table/group/port within the packet processing pipeline. All flow rules in all flow tables of the packet processing pipeline as well as groups are modified to send the traced data packets to a trace table after pushing the table-id or group-id into the data packet metadata. Registers are used to mark the table-id/group-id of the table/group which the traced data packet has passed through. In the trace table, whenever the trace bit is set in the packet metadata a copy of the data packet is sent to the controller for tracing, and the data packet is sent to the forward table. Whenever the trace bit is not set in the data packet metadata, the process sends the packet to forward table. In the forward table, the process applies a set of actions to the data packet based on the table-id or group-id in register. Data packets are forwarded from the trace table and analyzed to get the table-id and group-id/bucket-id, which is present to the service/user to verify whether the packet processing pipeline is operating proper. This process can be used to trace data packets across multiple data plane nodes as well. Whenever a trace packet is sent out of a port, the controller will check if the port is connected to any other data plane node from a topology inventory for the SDN network. If the outbound port is connected to some other data plane node, tracing will be restarted in table 0 of that data plane node thereby getting the complete trace of the data packet across multiple nodes in the SDN network. This trace process for data packets can be used to find the loops in flow control rules as well as within SDN network paths.

The embodiments provide advantages over other solutions and the prior art. The embodiments enable the tracing of a data packet processing path to a particular destination or a particular service inside a data plane node. The tracing of the data packet can be done even without real data traffic thereby enabling services to be tested and to resolve any issue with the packet processing pipeline before real data traffic is processed. Thus, troubleshooting can be done without real data traffic drops. Irrespective of the number of flow control rules and scale, data flows to a particular destination (e.g., L2 or L3 destinations) can be traced very effectively. The overhead for tracing the data flows/path is minimal. The tracing process can be used to detect flow control loops. The embodiments enable loops within a packet processing pipeline to be detected. If the same table-id is getting repeated again and again, the process can infer that the flow control loop exists. Also, the table which introduce the loop can be found. The embodiments can be used to trace data flows for both tables and groups in the packet processing pipeline. No flow control extensions are required to implement the embodiments. The embodiments don't affect the normal data traffic flow and flow entries. The embodiments be used to trace the data flows across multiple data plane nodes as well. In this way network loop detection can be achieved. The embodiments can be used to find the loops within data plane nodes and packet processing pipelines as well by tracing the path of data traffic across an SDN network. If the trace shows the same data flows in the same data plane node repeatedly, then the process can infer it as a network loop.

FIG. 1 is a diagram of one embodiment of an example packet processing pipeline within a networking device in an SDN. The packet processing pipeline 100 illustrates the complexity that can occur in a packet processing pipeline 100 as it is implemented at a data plane node. The illustrated packet processing pipeline 100 includes an initial Table 0 (101) that contains flow table entries upon which each incoming data packet is matched. From Table 0 the incoming data packets can be forwarded to other tables and groups 103 within the packet processing pipeline 100. These further tables and groups can further forward the data packet to additional tables and groups thereby implementing any number of services and functions such as dynamic host configuration protocol (DHCP), network address translation (NAT), address resolution protocol (ARP), forwarding and similar networking related functions and services in any quantity, order or hierarchy. Upon completion of the processing the data packet is forwarded to an outbound port 105 toward a next hop toward its destination.

The packet processing pipeline 100 is provided by way of example and not limitation to illustrate the complexity of packet processing pipelines and by extension the complexity of troubleshooting and tracing data packets as they traverse such packet processing pipelines. One skilled in the art would understand that the packet processing pipeline in some cases may include any number or combination of additional services and functions implemented as flow tables and groups within the data plane node. The packet processing pipeline is not constrained by size or complexity making the analysis and troubleshooting of undelivered or improperly processed data packets highly complex.

Figure 2:
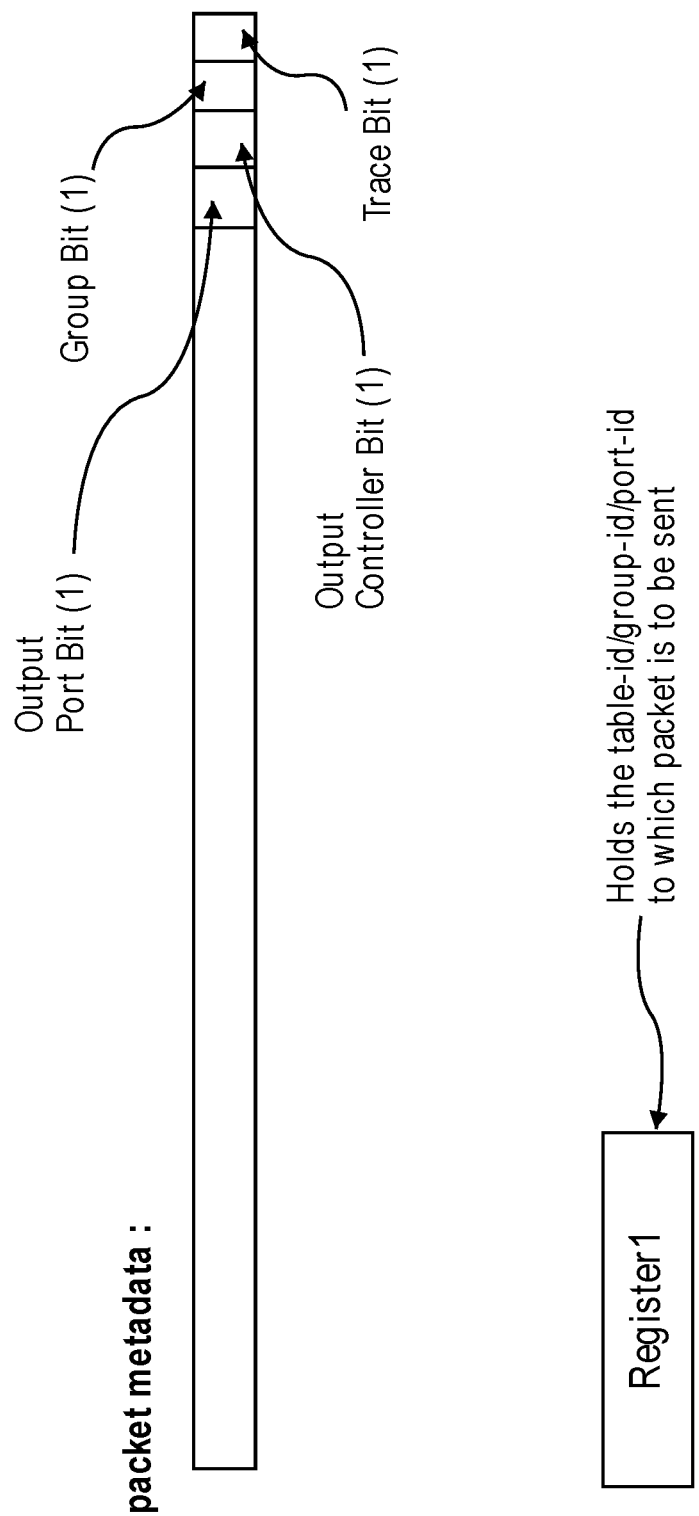
FIG. 2 is a diagram of one embodiment of a packet metadata and register as utilized in the tracing process.

FIG. 2 is a diagram of one embodiment of a packet metadata and register as utilized in the tracing process. In some embodiments, various bits of data packet metadata are used for tracing these data packets through a packet processing pipeline or across multiple data plane nodes. Any part or field in the metadata or even registers within the packet processing pipeline can be used for this purpose. In one example embodiment, the format for metadata includes a trace bit, which is a one bit field used to indicate whether data packet is to be traced or not. In a further example embodiment, that can be used in combination with the trace bit, a group bit is defines, which is a one bit field to indicates that the data packet is to be sent to a group in a specific register (e.g., register1). In one embodiment, an output controller bit maybe defined as a one bit field that indicates the data packet is to be sent to controller. In another embodiment, an output controller bit can be defined, which is a one bit field that indicates the packet has to be sent out of a port identified in register1. If these defined bits are not set, then the data packet can be sent to a table identified in a register (e.g. register1).

Setting Up the Trace Flow Infrastructure

Whenever an administrator or application seeks to perform a data packet trace, the SDN controller is utilized to do the trace. The trace flow detects how a set of data packets, the data flow, traverses a data packet processing pipeline. When a data packet is sent to a particular destination or a service is installed into the packet processing pipeline in a particular data plane node, where a trace to the destination or of the installed service is desired, a trace flow can be established by adding a trace table and forward table for a trace flow or updating an existing trace table and forward table. The trace table is new type of table for the embodiments that is created in the data plane node (i.e., a logical switch implemented by a network device). Data packets will be pointed to/forwarded to the trace table from all the tables and groups to check for trace bit. From the trace table, after the check, the data packet will be forwarded to forward table. The forward table is a new type of table for the embodiments, which is utilized to implement an action of any table or group and can result in an output of the data packet to another table, group, port, or to the controller. In other words, for every table, group and port created in the data plane node there will be a corresponding entry in trace table along with one entry to output to the SDN controller. Thus, a copy of the data packet will reach the SDN controller and be forwarded toward its destination when its trace bit is set. Table I is an example trace table.

TABLE I

Trace Table

| Match | Action |
| --- | --- |
| Trace bit in packet metadata | Output to controller, Goto Forward Table |
| Trace bit not set | Goto Forward Table |

The left hand 'match' side defines the matching criteria for the flow table entry, which in this case of the trace table is the trace bit. If the trace bit is set, then the action is executed by the packet processing pipeline. In this case, the action is to punt and forward the data packet. In other words, a copy is sent to the controller and another is forwarded to the forward table. If the trace bit is not set, then the data packet is forwarded to forward table.

The forward table is illustrated in Tables II-V.

Table II illustrates a high priority flow (for Groups):

TABLE II

| Match | Action |
| --- | --- |
| group bit set in packet metadata && register1 == groupx | goto groupx |
| group bit set in packet metadata && register1 == groupy | goto groupy |
| group bit set in packet metadata && register1 == groupz | goto groupz |

This forward table matches on the group bit in the received data packet and a value in a register used for trace flow processes. There will be flow entries for every flow control groups that is created. As shown in the table, where the group bit is set, the data packet will be forwarded to the group that is identified and matched in the register.

Table III is an example forward table for lower priority data flows (for Packet IN):

TABLE III

| Match | Action |
| --- | --- |
| Output controller bit set in packet metadata | Output to controller |

This forward table matches on the output controller bit in the received data packet. There will be flow entries for data packet to be sent directly to the SDN controller. As shown in the table, when the output controller bit is set, the data packet will be forwarded to the SDN controller.

Table IV is an example forward table for other lower priority data flows (for ports):

TABLE IV

| Match | Action |
| --- | --- |
| Output port bit set in packet metadata && register1 == port1 | Output to port1 |
| Output port bit set in packet metadata && register1 == port2 | Output to port2 |
| Output port bit set in packet metadata && register1 == port3 | Output to port3 |

This forward table matches on the output port bit in the received data packet and a value in a register used for the trace flow process. There will be flow entries for every physical port in the data plane node. As shown in the table, when the output port bit is set, the data packet will be forwarded to the output port identified and matched in the register.

Table V is an example forward table for lower priority flows (For Tables):

TABLE V

| Match | Action |
| --- | --- |
| Register1 == tablex | Goto tablex |
| Register1 == tabley | Goto tabley |
| Register1 == tablez | Goto tablez |

This forward table matches on the value in the register used for the trace flow process. There will be flow entries for every table in the data plane node. As shown in the table, when the register value matches a specific table identifier, the data packet will be forwarded to the table identified and matched in the register.

Modifying the Existing Trace Flows of Every Table and Group

The embodiments encompass the modification and updating of each existing data flow in every table and group. These flow table entries will have the output action to another table or group or physical port or to controller. All these actions are present in a trace table. So, flow entries are modified in such a way that, goto and output actions are replaced by goto trace table actions when the appropriate bit set in metadata and the corresponding values are set in the trace flow register.

Tables VI and VII are examples of flow tables and flow table entries (flow table X) that are modified to utilize the trace table and thereby implement the trace flow process for a given data flow.

Table VI is an example of an original flow entry, before modification to support a trace flow process.

TABLE VI

| Match | Action |
| --- | --- |
| Match on XXX | Action List -<br>1. YYY<br>2. ZZZ<br>3. Goto table y |

This flow table matches on any input according to the process, function or service it is implementing. At the end of the set of actions specified for the flow table entry, there is a 'goto' command that specifies where the matching data packet is to be sent after the other actions are completed. In this example, the data packet is sent to another table 'y.'

Table VII is an example of a modified flow table entry, where a trace flow process is supported.

TABLE VII

| Match | Action |
| --- | --- |
| Match on XXX | Action List -<br>1. YYY<br>2. ZZZ<br>3. Load Y to register1.<br>4. Goto trace table |

This flow table matches on any input according to the process, function or service it is implementing, which is unchanged from the original. At the end of the set of actions however, the flow table entry has been modified. The actions now specified for the flow table entry, include a load of the table id 'y' into the trace flow register and there is a modification of the 'goto' command that specifies where the matching data packet is to be sent after the other actions are completed. In this example, the data packet is now sent to the trace table instead of another table 'y.' In this way, as each flow table entry is modified accordingly, the trace flow process is implemented by having all data flows via their corresponding flow table entries, traverse the trace table and forward table to create copies that may be sent to the controller along with information about where the data packet has traversed in the data packet processing pipeline.

Tables VIII and IX are examples of flow tables and flow table entries (flow table Y) that are modified to utilize the trace table and thereby implement the trace flow process for a given data flow.

Table VIII is an example of an original flow entry, before modification to support a trace flow process.

TABLE VIII

| Match | Action |
| --- | --- |
| Match on ABC | Action List -<br>1. AAA<br>2. BBB<br>3. Output port-z |

This flow table matches on any input according to the process, function or service it is implementing. At the end of the set of actions specified for the flow table entry, there is a 'goto' command that specifies where the matching data packet is to be sent after the other actions are completed. In this example, the data packet is sent to an output port 'z.'

Table IX is an example of a modified flow table entry, where a trace flow process is supported.

TABLE IX

| Match | Action |
| --- | --- |
| Match on ABC | Action List -<br>1. AAA<br>2. BBB<br>3. Load Z to register1<br>4. Set Output port bit in metadata<br>5. Goto trace table |

This flow table matches on any input according to the process, function or service it is implementing, which is unchanged from the original. At the end of the set of actions however, the flow table entry has been modified. The actions now specified for the flow table entry, include a load of the port id 'z' into the trace flow register and there is a modification of the 'goto' command that specifies where the matching data packet is to be sent after the other actions are completed. In this example, the data packet is now sent to the trace table instead of the output port 'z.' In addition, before the goto there is inserted a command to modify the output port bit in the data packet metadata. In this way, as each flow table entry is modified to intercept the data packet before being forwarded to the output port and the trace flow process is implemented by having all data flows via their corresponding flow table entries, traverse the trace table and forward table to create copies that may be sent to the controller along with information about where the data packet has traversed in the data packet processing pipeline.

Tables X and XI are examples of groups and flow table entries (group X) that are modified to utilize the trace table and thereby implement the trace flow process for a given data flow.

Table X is an example of an original group flow entry, before modification to support a trace flow process.

TABLE X

| Buckets | Action |
| --- | --- |
| Bucket-1 | CCC<br>Output Port - X |
| Bucket-2 | DDD<br>Goto Group Y |

TABLE X-continued

| Buckets | Action |
| --- | --- |
| Bucket-3 | EEE<br>Output Controller |
| ... | ... |
| Bucket-n | NNN<br>Goto table-Z |

This group matches on any input according to the process, function or service it is implementing in the 'bucket' section to identify a group for the received data packet. At the end of the set of actions specified for each group flow table entry, there is an output or 'goto' command that specifies where the matching data packet is to be sent after the other actions are completed. In this example, the data packet is sent to an output port x, group y, the controller or table z depending on the group.

Table XI is an example of a group, where a trace flow process is supported.

TABLE XI

| Buckets | Action |
| --- | --- |
| Bucket-1 | CCC<br>Load X to register1<br>Set Output port bit in metadata<br>Goto trace table |
| Bucket-2 | DDD<br>Load Y to register1<br>Set Group bit in metadata<br>Goto trace table |
| Bucket-3 | EEE<br>Set Output Controller bit in metadata<br>Goto trace table |
| ... | ... |
| Bucket-n | NNN<br>Load Z to register1<br>Goto trace table |

This group flow table matches a group on any input according to the process, function or service it is implementing, which is unchanged from the original. At the end of the set of actions defined for each group however, the group flow table entry has been modified. The actions now specified for each group flow table entry, include a load of the port id, group id, table id as well as the setting of the group bit, output port bit or the controller bit as correlates to the group actions into the trace flow register and there is a modification of the 'goto' command that specifies where the matching data packet is to be sent after the other actions are completed. In this way, as each group flow table entry is modified to intercept the data packet before being forwarded to the output port and the trace flow process is implemented by having all data flows via their corresponding flow table entries, traverse the trace table and forward table to create copies that may be sent to the controller along with information about where the data packet has traversed in the data packet processing pipeline.

Tracing the Flow without Data Traffic

Figure 3A:
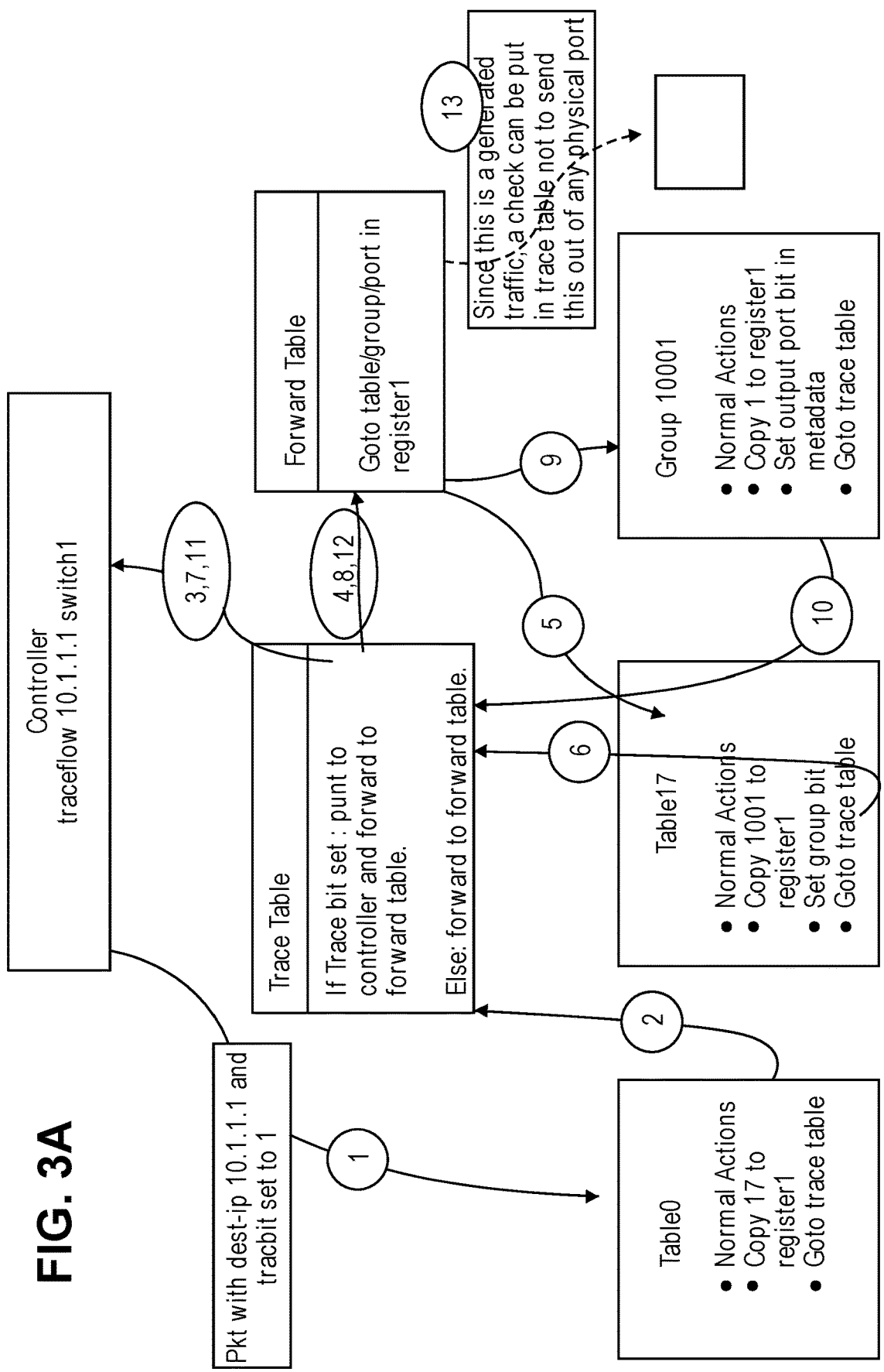
FIG. 3A is a diagram of one embodiment of a process of tracing a flow without data traffic.

FIG. 3A is a diagram of one embodiment of a process of tracing a flow without data traffic. When a trace flow is to be enabled for a particular destination, the controller generates a set of trace packets with a desired destination, the trace bit is set with 1 and then the controller sends the set of trace packets to the specified switch, specifically to its table 0. A 'set,' as used herein may be any positive whole number of items including one. A single trace packet may be sufficient for some tracing while a larger set of trace packets can be generated in other circumstances. The trace flow process may be initiated with a command such as:

trace flow <ip-address/mac-address> <switch-id>

In some embodiments, the user (e.g., an administrator) can input a sample packet and the switch-id. In this example, the controller can send the input packet to switch with a command such as:

trace flow <packet> <switch-id>e.g.: trace flow 10.1.1.1 switch1

Any application that interfaces with the controller or any administrator or similar user can initiate this trace flow process. On getting a request like this, the controller forms a sample packet with destination (e.g., an IP of 10.1.1.1 and the correct MAC address from an ARP table, sets the trace bit to 1 and sends the trace packet to the target switch using the flow control protocol to insert the trace data packet into the packet processing pipeline i.e. starting at table 0 of target data plane node.

The figure illustrates the movement of this process via the traversal of the data packet across the tables and groups of the packet processing pipeline with each step enumerated. The sending of the trace packet to the data plane node (switch1) is step 1 in the example. The trace data packet is then processed by table 0. From table 0, it goes to the trace table (step 2) and from there to forward table (step 4) and a copy is sent to the controller (step 3). The copy therefore shows the state of the trace packet after table 0. From the forward table based on the value placed in register1 by table 0, the trace packet is sent to next table 17 (step 5). Again, after processing at the table 17, the trace packet is returned to the trace table (step 6). While in table 17, the trace register (register1) is updated to identify the next group destination for the trace packet. The trace table sends a copy to the controller (step 7) and to the forward table (step 8). The forward table sends the trace packet to the group 1001 (step 9). The group has been modified so that the trace packet is returned to the trace table (step 10), where a copy is sent to the controller (step 11) and the forward table (step 12) before being forwarded to the output port (step 13). IN some embodiments, each time the copy of the trace packet is sent to the controller a copy of the trace register is also sent. In other embodiments, the trace register is part of the trace packet. Thus, the controller receives a copy of the trace packet after each table or group traversed and looking at the trace register of different trace packets the controller can identify the stage of or differentiate the packet trace. In one example, the trace starts from dispatcher table (table 17), but since controller knows it starts from table0, it appends table0 in the beginning (e.g., table 0-table 17-group 10001-output-Port1).

FIG. 3B is a flowchart of one embodiment of a process for trace flow processing at a data plane node. In one embodiment, the process is initiated at the data plane node in the packet processing pipeline when a trace packet is received (Block 301). The trace packet can be received from a controller or marking module. The trace packet is sent to the first flow table (e.g., table 0) to initiate processing of the packet (Block 303). The first flow table then forwards the trace packet to the trace table (Block 305). Other packet processing actions may also be carried out in the first flow table. In some cases, a load command or similar operation places a value into a trace register that identifies a next destination such as a group identifier, table identifier or port identifier. Similarly, meta data may be updated in the trace packet to identify the type of the destination that is being placed in the trace register using an output port bit to indicate the next destination is an output port, an output controller bit to indicate the next destination is the controller, a group bit to indicate the next destination is a group, or similar metadata fields. At the trace table, a determination is made whether the trace bit is set in the trace packet (Block 307). If the trace bit is set, then a copy of the data packet is sent to the trace analyzer (Block 309).

After processing at the trace table, the trace packet is sent to the forward table (Block 311). The forward table determines how to forward the trace packet by checking the meta data and the value in the trace register (Block 313). The meta data can indicate the type of destination table/group/port and the register can contain the identifier for that destination table id/group id/port id. This information is placed into the trace packet and trace register by commands in the flow table or group that sent the trace packet to the trace table. Using this information, the forward table then sends the trace packet to the next stage of the packet processing pipeline (Block 315). The trace flow process can continue to send the trace packet back to the trace table and forward table until trace packet exits the packet processing pipeline of the data plane node.

FIG. 3C is a flowchart of one embodiment of a process for modifying flow entries to support a trace process. This process can be done whenever a flow table or group is installed or updated. In other embodiments, the controller may iteratively update the flow tables and groups. In the example, the flow tables and groups are being iteratively updated. However, one skilled in the art would understand that the principles, steps and actions described are applicable to other scenarios and implementations. In the example embodiment, the process selects a first flow table or group to access and update (Block 351). A check may be performed for each flow entry whether it includes an action for a goto command (Block 353). If a goto command is present, then a command to load the destination of the goto into a trace register (e.g., register1) can be inserted into the flow entry and the goto command in the flow entry is updated to be a goto the trace table (Blocks 355 and 357). An action may also be inserted to update the meta data of the trace packet according to the type of the destination. For example, where the destination is a group, then a group bit may be set. A check is made whether all flow entries have been updated (Block 359). If further flow entries remain to be updated, then the process continues to the next flow entry (Block 351). If all flow entries have been updated, then the process concludes.

Tracing the Live Traffic

Figure 4:
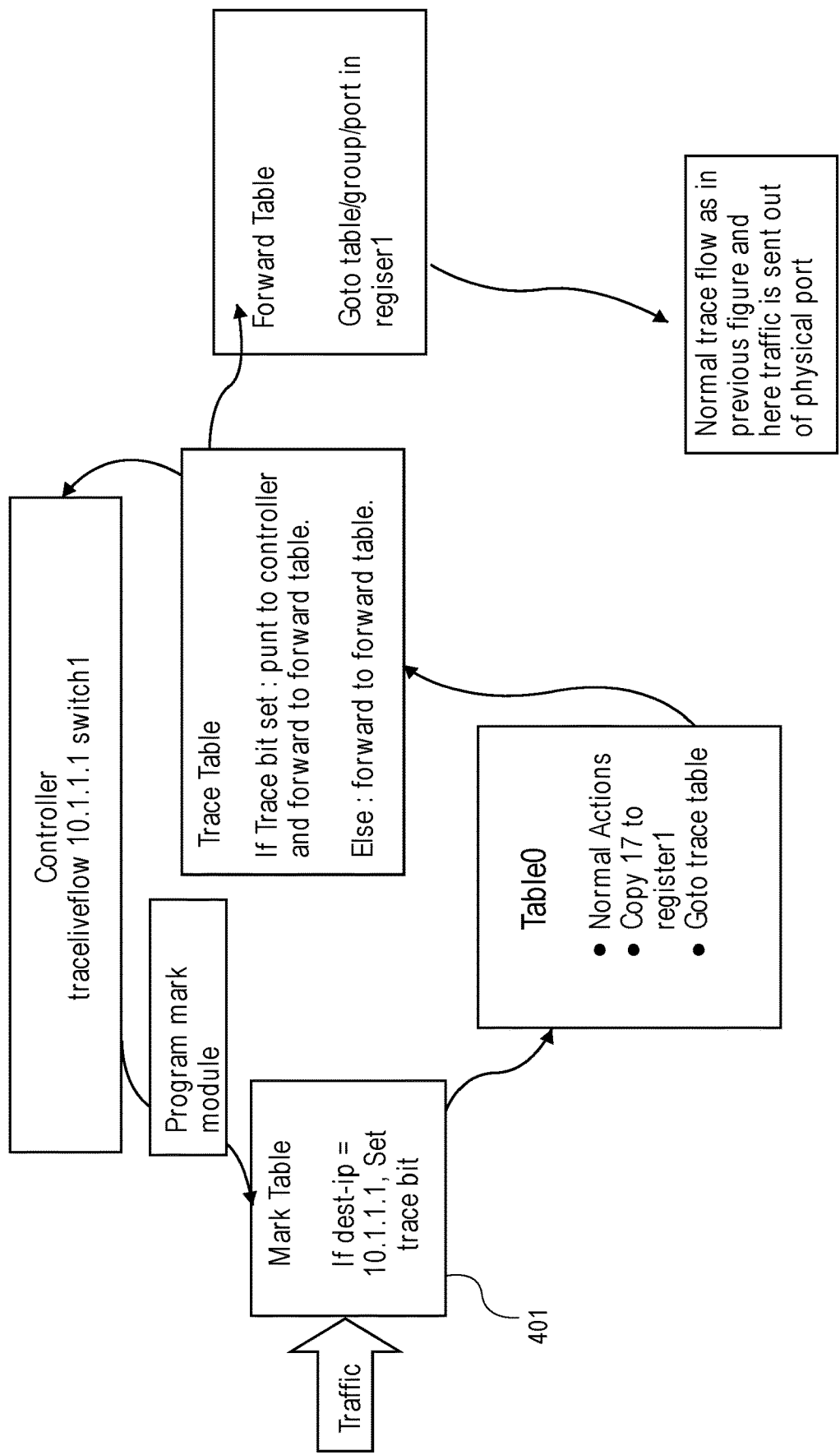
FIG. 4 is a diagram of one embodiment of a process of tracing a flow with live data traffic.

FIG. 4 is a diagram of one embodiment of a process of tracing a flow with live data traffic. The embodiments also support a mechanism to trace live data traffic instead of using generated artificial traffic. The live trace flow process utilizes a mark module 401 before the live data traffic arrives at a target data plane node or at the start of a path including multiple data plane nodes to be traced. The mark module 401 marks the live data traffic being forwarded to the target data plane node that needs to be traced, so that in the flow control tables and groups of the target data plane node support forwarding of copies of the data traffic to the controller.

This process can similarly be initiated by a command such as:

traceliveflow <ip-address/mac-address> <switch-id>e.g.: traceliveflow 10.1.1.1 switch1.

On getting such a request from an administrator or similar user, the controller sets up the mark module to mark all packets to destination 10.1.1.1. The mark module sets a trace bit in the live data traffic destined for the target data plane node. All data traffic can be marked in this manner or any number or subset of the live data traffic can be marked. In other respects, the trace flow process proceeds as with the prior example of the generated trace packets. The flow table entries are similarly modified and the trace table and forward table configured.

Trace Flow Collection in a Controller

Once the copy of the traced data packet is received (i.e., the packet-in message is received) at the controller from any data plane module, if the trace bit is set in the metadata it is identified as a trace packet and is given to trace analyzer application in the controller. For a given example trace, a first trace packet may come from a table (e.g., table17) and not from table0. However, since the data packet pipeline always starts from table 0, the trace analyzer in the controller can automatically append table0 to the beginning of the trace.

Whenever a data packet with a set trace bit comes from a table, the trace analyzer in the controller may create a hash map or similar hash (e.g., with a 14-17 header+payload of the data packet). For the subsequent data packets, the trace analyzer looks up the hash map, reads the trace register (e.g., register1), where the table/group info is present and publishes the trace accordingly.

e.g.: trace flow 00:01:12:31:66:54 switch1 table 0-table 17-table 53-group 1008-group 1020-port2 or port3

Packet Processing Pipeline Loop|Detection

In some embodiments, the trace flow process can be used to detect loops in the data packet processing pipeline. When a loop happens, the data traffic to one or more destination(s) will be dropped. The trace flow process to that destination can be started which gives a result such as:

Table 0-table 17-table 52-table 53-group 2020-table 52-table 53-group 2020-table 52 . . . .

The trace analyzer at the controller can look into the result or partial result and determine the cause of the dropped data packets. In this case, it can be determined that a loop has occurred in table 52, 53, and group 2020 by traversing the trace to find repeated tables and groups. The trace analyzer at the controller can inform the corresponding service which programmed these tables and can thereby enable the data plane node to recover from the loop.

Tracing Multiple Switches

In some embodiments when there are lot of data plane nodes under the responsibility of a controller, then tracing the data flows in each one of these data plane nodes and their respective packet processing pipeline separately and combining all the separate traces based on the topology is computationally and resource intensive task. The embodiments can be expanded to operate over multiple switches in the same SDN controller domain. The trace packet is generated for the target data plane node with a particular destination set. The trace packet generation is the same as described herein above. The difference with the multiple node implementation occurs where the action to be applied to a trace packet is to send it out of a physical port. In this case the trace analyzer at the controller will check in the topology inventory, to determine what nodes are connected to that output port.

If the next data plane node is under the same controller domain, then the trace packet is sent out of the port. However, if the next hop is not a node in the controller domain, then the trace packet may be discarded. At the next node along the path of the trace packet, the trace flow process is continued. The trace flow process can continue until the trace packet reaches the destination or if it goes out of controller domain. The multiple hop trace can be called by a command such as:

tracenetwork <ip-address/mac-address> <switch-id>

Figure 5:
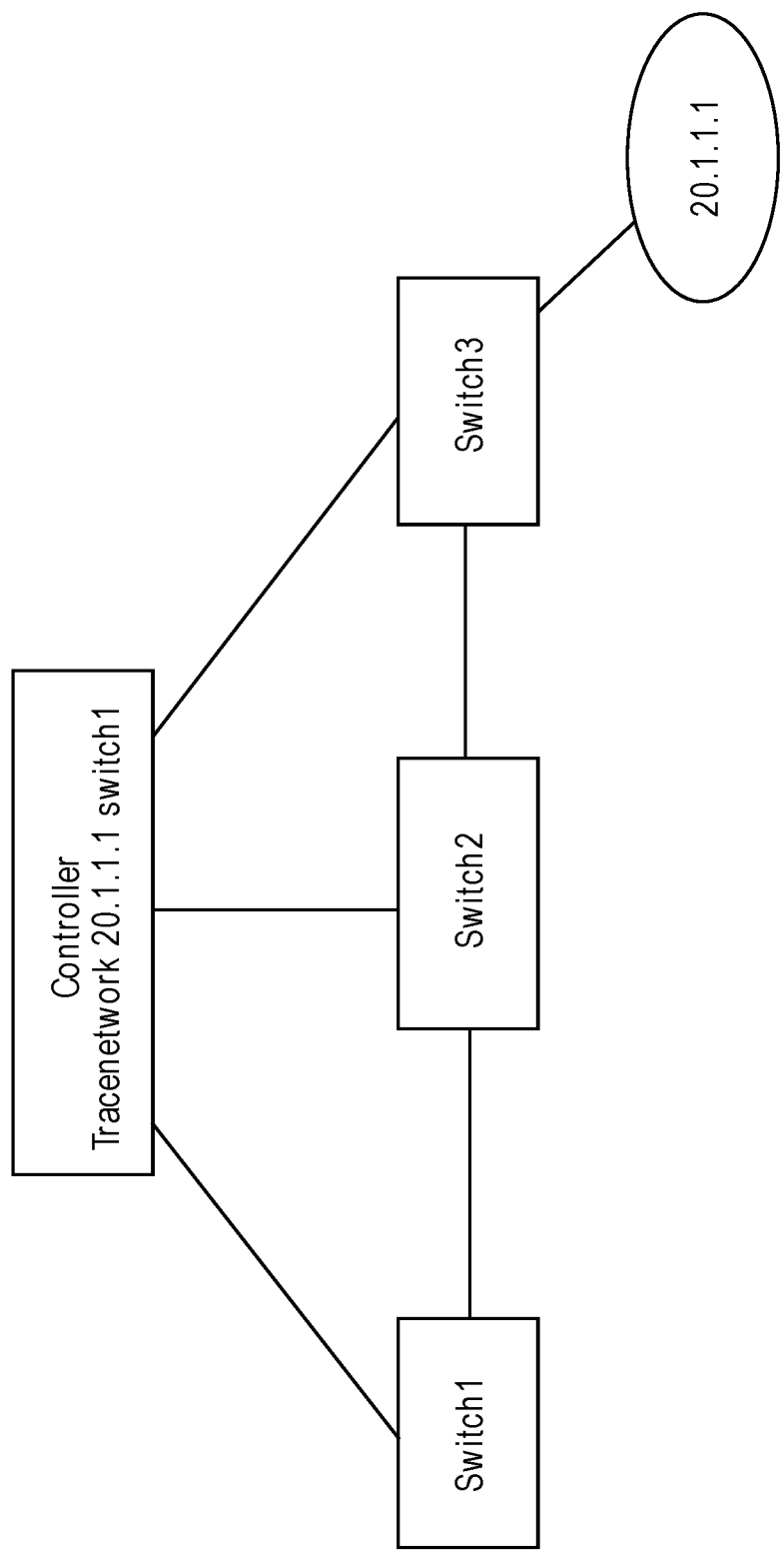
FIG. 5 is a diagram of one embodiment of a process of tracing a flow across multiple logical switches or nodes in the SDN.

FIG. 5 is a diagram of one embodiment of a process of tracing a flow across multiple logical switches or nodes in the SDN. In this example application, the trace flow process may seek to traverse a path from switch1 to the out of SDN network address of 20.1.1.1. This process may be called by a command such as, tracenetwork 20.1.1.1 switch1

In the illustrated topology, tracenetwork to 20.1.1.1, starts from switch1 as specified by the user or calling application and would generate an output like:

switch1-table 0-table17-table 51-port2
switch2-table 0-table 17-table 21-group 10010-port3
switch3-table 0-table 17-table 21-table 22-group 10020-port2

Network Loop Detection and Connection Issues

The embodiments can also be applied to detect loops in the SDN network domain within the data plane nodes and also can detect the connection issues between the data plane nodes. When the trace packet to a destination is forwarded out of a port and but does not reach the next switch connected to that port, it can be detected by the trace analyzer and can be reported as a connection problem between the data plane nodes.

If there exists a loop between switch2 and switch3 in the topology of FIG. 5, tracenetwork would give an output like:

switch1-table 0-table17-table 51-port2
switch2-table 0-table 17-table 21-group 10010-port3
switch3-table 0-table 17-table 21-table 22-group 10020-port2
switch1-table 0-table17-table 51-port2

The trace analyzer at the controller would detect the same switch in the trace repeated and report a network loop.

Drop Table

As described above, the embodiments provide an efficient mechanism to trace data packets in a data packet processing pipeline, with a flexibility of enabling a trace at a very generic level/granular level depending on the administrator's needs. The embodiments trace data flows in multiple data plane nodes connected to the same SDN controller. In further embodiments, the core aspects of the embodiments are further extended to include a drop table. The drop table is introduced in the packet processing pipeline, and will have a default action to DROP packets that reach this table. In some embodiments, all flow/group entries installed by applications should point to this DROP table, in the case the flow/group entries have an explicit DROP action. In some embodiments, flow tables which don't have a default flow action can have a default flow entry added to forward data packets to the drop Table In further embodiments, users can enable whole/partial DEBUGGING by snooping packets from the DROP table.

In some embodiments, when users want to analyze why a particular packet is getting dropped, the user can enable selective tracing for that particular packet in the drop table. This can be achieved by making use of several further embodiments as listed below:

(1) A trace embodiment can be used, where the difference will be that the trace bit setting can be done at the DROP table whenever a particular packet of interest is seen to be dropped. After setting the trace bit in the metadata, the packet can be resubmitted to the beginning of the packet processing pipeline. From every from table a copy of the trace packet is forwarded to the controller thereby ensuring the controller will get to know the exact trace of packets which are getting dropped. In another embodiment, (2) if the administrator wants to determine where the packet is getting dropped, the packet of interest can be forwarded to the controller from the DROP table. Packet-in messages will come with all match fields and will give a clear indication of what all the packet was matched on to that point. If the exact table-id or group-id is required the same can be pushed in some metadata before sending the trace packet to the DROP table.

Thus, the embodiments provide a packet processing path to a particular destination or a particular service inside a data plane node can be traced. Tracing can be done for the exact same packet for which a drop is happening. Dropped packets can be traced and thereby reduce the controller channel bandwidth utilization and improve the overall trace performance. The embodiments can be used to trace flows for both tables and groups in the packet processing pipeline. Flow control protocol extensions are not required. The embodiments can be used to trace the data flows in multiple data plane nodes within an SDN network domain.

Setting the Tracing Infrastructure

Whenever a controller programs flow/group entries of various switches connected to the SDN domain, it can setup the tracing infrastructure by default. Setting up the tracing infrastructure is a combination of setting up the DROP table and setting up the trace path.

Adding a Drop Table:

The embodiments provide a new type of table for the packet processing pipeline called a drop table. If any flow/group entry is to be installed on the data plane node has a drop action, it will be replaced by a goto to the drop table instruction. If any tables don't have an explicit default flow entry action, a default flow entry action will be added by controller to goto the drop table. In other words, all actions which will result in a drop of packet, will be replaced by a goto the drop table. The drop table will in turn have a default flow entry to drop all packets. Depending on the user or applications needs more flow entries can be added in the drop table, when there is a desire to analyze a particular packet getting dropped.

Tables XII-XIV are example entries for the drop table starting with the highest priority data flows, in the example implementation, data flows with a set trace bit.

Highest Priority Flow (for Trace Bit):

TABLE XII

| Match | Action |
| --- | --- |
| Trace bit in packet metadata | Action List<br>DROP |

In this entry, all data packets with the trace bit set are detected and then dropped by the defined action.

Default Flow:

TABLE XIII

| Match | Action |
| --- | --- |
| NIL | Action List<br>DROP |

This entry covers default scenarios where non-trace bit set packets are also dropped.

In Table XIV, data flows installed by an administrator for debugging are handled to support full tracing.

TABLE XIV

| Match | Action |
| --- | --- |
| Packet specific matches | Set TRACE BIT in metadata, resubmit to Table 0 |

This entry is used to mark data packets to be traced through the data packet pipeline.

In Table XV, data flows installed by an administrator for debugging are handled to support full tracing.

TABLE XV

| Match | Action |
| --- | --- |
| Packet specific matches | Output: CONTROLLER |

This entry is used to identify specific data packet to be sent directly to the controller for debugging purposes.

Modifying Flow/Group Entries to Point to Drop Table

In one embodiment, every existing flow entry in every table and group which has Drop action should be replaced to point to the drop table. This can be done as a onetime activity and can be enforced as part of the pipeline design itself. So that all applications will use a 'goto' drop table instead of a drop action as the initial implementation itself Tables XVII and XVIII show original and modified entries for table X.

Original Flow Entry:

TABLE XVII

| Match | Action |
| --- | --- |
| Match on XXX | Action List - 1. DROP |

This entry is used to drop specific packets with XXX criteria.

Modified Flow Entry:

TABLE XVIII

| Match | Action |
| --- | --- |
| Match on XXX | Action List - 1. Goto DROP table |
| Default Flow | Goto DROP table |

This entry is updated to send the packet that previously be dropped to the Drop table to aid in tracing and debugging.

Tables XIX—show the modification of group entries for example group X.

Original Flow Entries:

TABLE XIX

| Buckets | Action |
| --- | --- |
| Bucket-1 | CCC<br>Output Port - X |
| Bucket-2 | DDD<br>Goto Group Y |
| Bucket-3 | EEE<br>DROP |

This group sorts data packets into three groups where the third group has an action to drop the data packets.

Table XX—shows modified group flow entries:

TABLE XX

| Buckets | Action |
| --- | --- |
| Bucket-1 | CCC<br>Output Port - X |
| Bucket-2 | DDD<br>Goto Group Y |
| Bucket-3 | EEE<br>Goto DROP Table |

This modified set of group entries shows that the drop action is removed for the third group and replaced with a goto the drop table.

Tracing the Live Traffic with a Drop Table:

The embodiments encompass, an efficient mechanism to trace live traffic drops. The drop table marks the live data traffic coming to the data plane node that needs to be traced and is getting dropped, and then resubmits the same to Ingress Table (Table0), so that in the subsequent iterations, the marked data packet will be handled as a trace packet as per the trace flow process described above. In these embodiments, there is no need of a separate mark module at the beginning of the packet processing pipeline. An example syntax of the command may be:

traceliveflow <ip-address/mac-address> <switch-id> e.g.: traceliveflow 10.1.1.1 switch1

Figure 6:
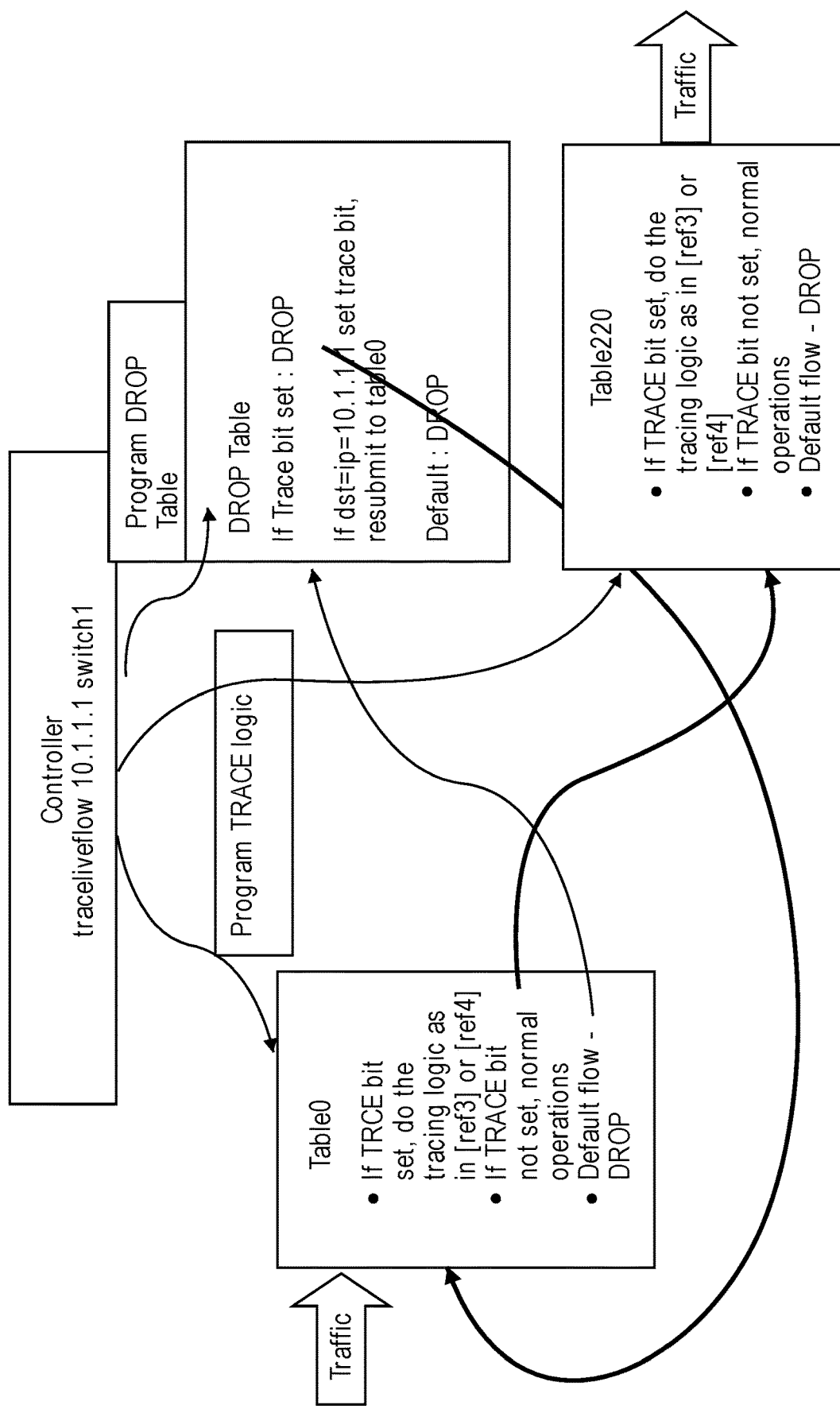
FIG. 6 is a diagram of another embodiment of a process for tracing live data traffic.

Upon receipt of such a request from a user, the controller sets up the drop table to mark all packets to destination 10.1.1.1 which are forwarded to the drop table by setting the trace bit in packet metadata and resubmitting it to table 0. The marked trace packets then are forwarded to be reprocessed at table 0 since the trace bit is set, the marked trace packet will be copied to the controller from all the tables in the path till the packet reaches the drop table. In the drop table, the data packets with a trace bit set are dropped. FIG. 6 is a diagram of an example embodiment of a process for tracing live data traffic using the drop table.

Figure 7A:
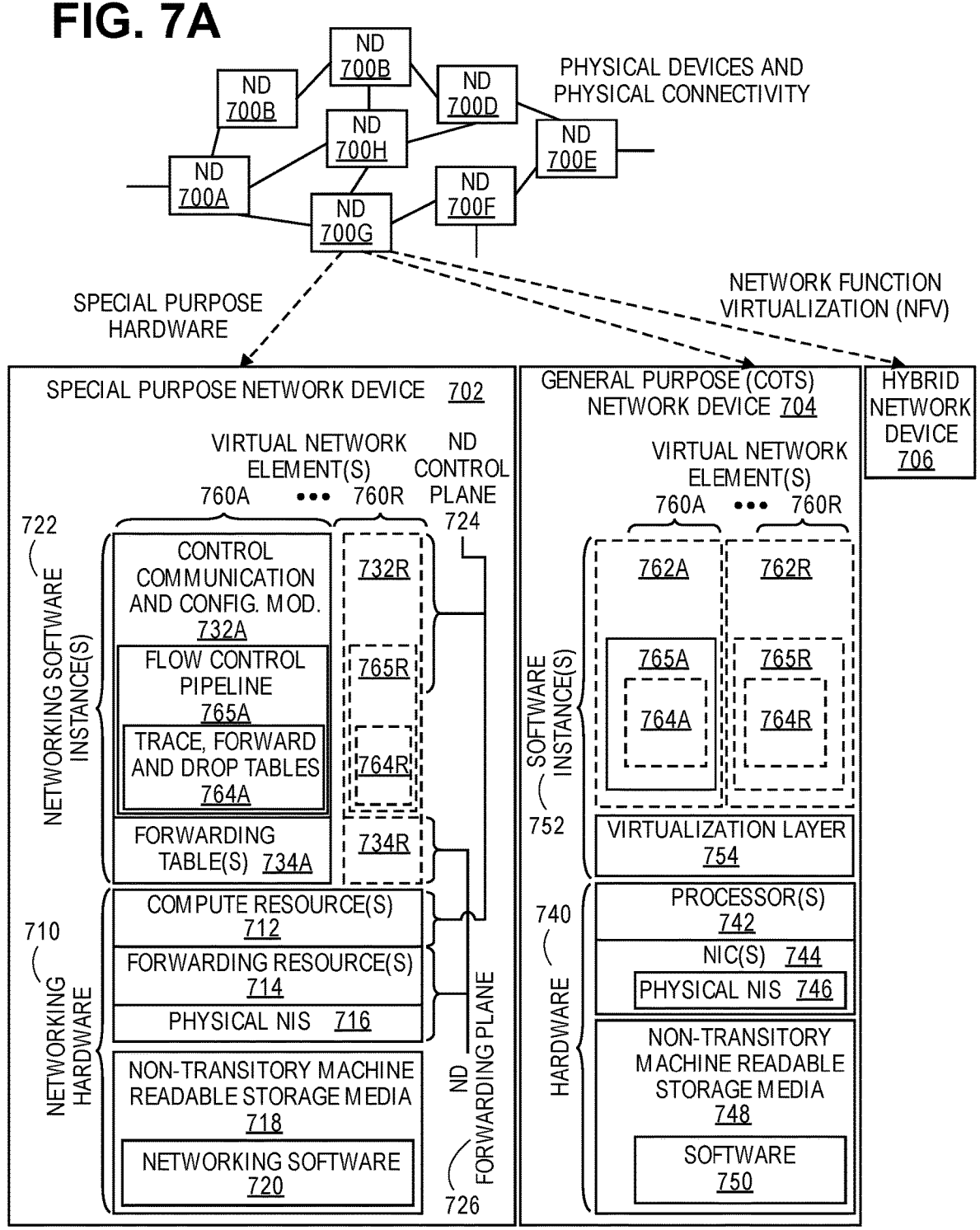
FIG. 7A illustrates connectivity between network devices (NDs) within an exemplary network, as well as three exemplary implementations of the NDs, according to some embodiments of the invention.

FIG. 7A illustrates connectivity between network devices (NDs) within an exemplary network, as well as three exemplary implementations of the NDs, according to some embodiments of the invention. FIG. 7A shows NDs 700A-H, and their connectivity by way of lines between 700A-700B, 700B-700C, 700C-700D, 700D-700E, 700E-700F, 700F-700G, and 700A-700G, as well as between 700H and each of 700A, 700C, 700D, and 700G. These NDs are physical devices, and the connectivity between these NDs can be wireless or wired (often referred to as a link). An additional line extending from NDs 700A, 700E, and 700F illustrates that these NDs act as ingress and egress points for the network (and thus, these NDs are sometimes referred to as edge NDs; while the other NDs may be called core NDs).

Two of the exemplary ND implementations in FIG. 7A are: 1) a special-purpose network device 702 that uses custom application-specific integrated-circuits (ASICs) and a special-purpose operating system (OS); and 2) a general-purpose network device 704 that uses common off-the-shelf (COTS) processors and a standard OS.

The special-purpose network device 702 includes networking hardware 710 comprising a set of one or more processor(s) 712, forwarding resource(s) 714 (which typically include one or more ASICs and/or network processors), and physical network interfaces (NIs) 716 (through which network connections are made, such as those shown by the connectivity between NDs 700A-H), as well as non-transitory machine-readable storage media 718 having stored therein networking software 720. During operation, the networking software 720 may be executed by the networking hardware 710 to instantiate a set of one or more networking software instance(s) 722. Each of the networking software instance(s) 722, and that part of the networking hardware 710 that executes that network software instance (be it hardware dedicated to that networking software instance and/or time slices of hardware temporally shared by that networking software instance with others of the networking software instance(s) 722), form a separate virtual network element 730A-R. Each of the virtual network element(s) (VNEs) 730A-R includes a control communication and configuration module 732A-R (sometimes referred to as a local control module or control communication module) and forwarding table(s) 734A-R, such that a given virtual network element (e.g., 730A) includes the control communication and configuration module (e.g., 732A), a set of one or more forwarding table(s) (e.g., 734A), and that portion of the networking hardware 710 that executes the virtual network element (e.g., 730A).

The special-purpose network device 702 is often physically and/or logically considered to include: 1) a ND control plane 724 (sometimes referred to as a control plane) comprising the processor(s) 712 that execute the control communication and configuration module(s) 732A-R; and 2) a ND forwarding plane 726 (sometimes referred to as a forwarding plane, a data plane, or a media plane) comprising the forwarding resource(s) 714 that utilize the forwarding table(s) 734A-R and the physical NIs 716. By way of example, where the ND is a router (or is implementing routing functionality), the ND control plane 724 (the processor(s) 712 executing the control communication and configuration module(s) 732A-R) is typically responsible for participating in controlling how data (e.g., packets) is to be routed (e.g., the next hop for the data and the outgoing physical NI for that data) and storing that routing information in the forwarding table(s) 734A-R, and the ND forwarding plane 726 is responsible for receiving that data on the physical NIs 716 and forwarding that data out the appropriate ones of the physical NIs 716 based on the forwarding table(s) 734A-R.

Figure 7B:
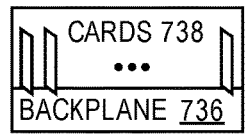
FIG. 7B illustrates an exemplary way to implement a special-purpose network device according to some embodiments of the invention.

FIG. 7B illustrates an exemplary way to implement the special-purpose network device 702 according to some embodiments of the invention. FIG. 7B shows a special-purpose network device including cards 738 (typically hot pluggable). While in some embodiments the cards 738 are of two types (one or more that operate as the ND forwarding plane 726 (sometimes called line cards), and one or more that operate to implement the ND control plane 724 (sometimes called control cards)), alternative embodiments may combine functionality onto a single card and/or include additional card types (e.g., one additional type of card is called a service card, resource card, or multi-application card). A service card can provide specialized processing (e.g., Layer 4 to Layer 7 services (e.g., firewall, Internet Protocol Security (IPsec), Secure Sockets Layer (SSL)/Transport Layer Security (TLS), Intrusion Detection System (IDS), peer-to-peer (P2P), Voice over IP (VoIP) Session Border Controller, Mobile Wireless Gateways (Gateway General Packet Radio Service (GPRS) Support Node (GGSN), Evolved Packet Core (EPC) Gateway)). By way of example, a service card may be used to terminate IPsec tunnels and execute the attendant authentication and encryption algorithms. These cards are coupled together through one or more interconnect mechanisms illustrated as backplane 736 (e.g., a first full mesh coupling the line cards and a second full mesh coupling all of the cards).

Returning to FIG. 7A, the general-purpose network device 704 includes hardware 740 comprising a set of one or more processor(s) 742 (which are often COTS processors) and physical NIs 746, as well as non-transitory machine-readable storage media 748 having stored therein software 750. During operation, the processor(s) 742 execute the software 750 to instantiate one or more sets of one or more applications including a flow control pipeline 765A-R including trace tables, forward tables and/or drop tables 765A-R. While one embodiment does not implement virtualization, alternative embodiments may use different forms of virtualization. For example, in one such alternative embodiment the virtualization layer 754 represents the kernel of an operating system (or a shim executing on a base operating system) that allows for the creation of multiple instances 762A-R called software containers that may each be used to execute one (or more) of the sets of applications including the flow control pipeline 764A-R; where the multiple software containers (also called virtualization engines, virtual private servers, or jails) are user spaces (typically a virtual memory space) that are separate from each other and separate from the kernel space in which the operating system is run; and where the set of applications running in a given user space, unless explicitly allowed, cannot access the memory of the other processes. In another such alternative embodiment the virtualization layer 754 represents a hypervisor (sometimes referred to as a virtual machine monitor (VMM)) or a hypervisor executing on top of a host operating system, and each of the sets of applications including the flow control pipeline 764A-R is run on top of a guest operating system within an instance 762A-R called a virtual machine (which may in some cases be considered a tightly isolated form of software container) that is run on top of the hypervisor—the guest operating system and application may not know they are running on a virtual machine as opposed to running on a "bare metal" host electronic device, or through para-virtualization the operating system and/or application may be aware of the presence of virtualization for optimization purposes. In yet other alternative embodiments, one, some or all of the applications are implemented as unikernel(s), which can be generated by compiling directly with an application only a limited set of libraries (e.g., from a library operating system (LibOS) including drivers/libraries of OS services) that provide the particular OS services needed by the application. As a unikernel can be implemented to run directly on hardware 740, directly on a hypervisor (in which case the unikernel is sometimes described as running within a LibOS virtual machine), or in a software container, embodiments can be implemented fully with unikernels running directly on a hypervisor represented by virtualization layer 754, unikernels running within software containers represented by instances 762A-R, or as a combination of unikernels and the above-described techniques (e.g., unikernels and virtual machines both run directly on a hypervisor, unikernels and sets of applications that are run in different software containers).

The instantiation of the one or more sets of one or more applications including the flow control pipeline 764A-R, as well as virtualization if implemented, are collectively referred to as software instance(s) 752. Each set of applications, corresponding virtualization construct (e.g., instance 762A-R) if implemented, and that part of the hardware 740 that executes them (be it hardware dedicated to that execution and/or time slices of hardware temporally shared), forms a separate virtual network element(s) 760A-R.

The virtual network element(s) 760A-R perform similar functionality to the virtual network element(s) 730A-R—e.g., similar to the control communication and configuration module(s) 732A and forwarding table(s) 734A (this virtualization of the hardware 740 is sometimes referred to as network function virtualization (NFV)). Thus, NFV may be used to consolidate many network equipment types onto industry standard high volume server hardware, physical switches, and physical storage, which could be located in Data centers, NDs, and customer premise equipment (CPE). While embodiments of the invention are illustrated with each instance 762A-R corresponding to one VNE 760A-R, alternative embodiments may implement this correspondence at a finer level granularity (e.g., line card virtual machines virtualize line cards, control card virtual machine virtualize control cards, etc.); it should be understood that the techniques described herein with reference to a correspondence of instances 762A-R to VNEs also apply to embodiments where such a finer level of granularity and/or unikernels are used.

In certain embodiments, the virtualization layer 754 includes a virtual switch that provides similar forwarding services as a physical Ethernet switch. Specifically, this virtual switch forwards traffic between instances 762A-R and the physical NI(s) 746, as well as optionally between the instances 762A-R; in addition, this virtual switch may enforce network isolation between the VNEs 760A-R that by policy are not permitted to communicate with each other (e.g., by honoring virtual local area networks (VLANs)).

The third exemplary ND implementation in FIG. 7A is a hybrid network device 706, which includes both custom ASICs/special-purpose OS and COTS processors/standard OS in a single ND or a single card within an ND. In certain embodiments of such a hybrid network device, a platform VM (i.e., a VM that that implements the functionality of the special-purpose network device 702) could provide for para-virtualization to the networking hardware present in the hybrid network device 706.

Regardless of the above exemplary implementations of an ND, when a single one of multiple VNEs implemented by an ND is being considered (e.g., only one of the VNEs is part of a given virtual network) or where only a single VNE is currently being implemented by an ND, the shortened term network element (NE) is sometimes used to refer to that VNE. Also in all of the above exemplary implementations, each of the VNEs (e.g., VNE(s) 730A-R, VNEs 760A-R, and those in the hybrid network device 706) receives data on the physical NIs (e.g., 716, 746) and forwards that data out the appropriate ones of the physical NIs (e.g., 716, 746). For example, a VNE implementing IP router functionality forwards IP packets on the basis of some of the IP header information in the IP packet; where IP header information includes source IP address, destination IP address, source port, destination port (where "source port" and "destination port" refer herein to protocol ports, as opposed to physical ports of a ND), transport protocol (e.g., user datagram protocol (UDP), Transmission Control Protocol (TCP), and differentiated services code point (DSCP) values.

Figure 7C:
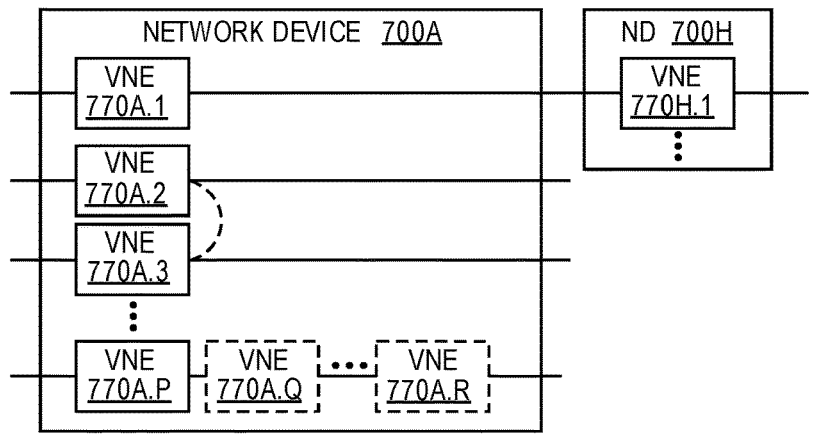
FIG. 7C illustrates various exemplary ways in which virtual network elements (VNEs) may be coupled according to some embodiments of the invention.

FIG. 7C illustrates various exemplary ways in which VNEs may be coupled according to some embodiments of the invention. FIG. 7C shows VNEs 770A.1-770A.P (and optionally VNEs 770A.Q-770A.R) implemented in ND 700A and VNE 770H.1 in ND 700H. In FIG. 7C, VNEs 770A.1-P are separate from each other in the sense that they can receive packets from outside ND 700A and forward packets outside of ND 700A; VNE 770A.1 is coupled with VNE 770H.1, and thus they communicate packets between their respective NDs; VNE 770A.2-770A.3 may optionally forward packets between themselves without forwarding them outside of the ND 700A; and VNE 770A.P may optionally be the first in a chain of VNEs that includes VNE 770A.Q followed by VNE 770A.R (this is sometimes referred to as dynamic service chaining, where each of the VNEs in the series of VNEs provides a different service—e.g., one or more layer 4-7 network services). While FIG. 7C illustrates various exemplary relationships between the VNEs, alternative embodiments may support other relationships (e.g., more/fewer VNEs, more/fewer dynamic service chains, multiple different dynamic service chains with some common VNEs and some different VNEs).

The NDs of FIG. 7A, for example, may form part of the Internet or a private network; and other electronic devices (not shown; such as end user devices including workstations, laptops, netbooks, tablets, palm tops, mobile phones, smartphones, phablets, multimedia phones, Voice Over Internet Protocol (VOIP) phones, terminals, portable media players, GPS units, wearable devices, gaming systems, set-top boxes, Internet enabled household appliances) may be coupled to the network (directly or through other networks such as access networks) to communicate over the network (e.g., the Internet or virtual private networks (VPNs) overlaid on (e.g., tunneled through) the Internet) with each other (directly or through servers) and/or access content and/or services. Such content and/or services are typically provided by one or more servers (not shown) belonging to a service/content provider or one or more end user devices (not shown) participating in a peer-to-peer (P2P) service, and may include, for example, public webpages (e.g., free content, store fronts, search services), private webpages (e.g., username/password accessed webpages providing email services), and/or corporate networks over VPNs. For instance, end user devices may be coupled (e.g., through customer premise equipment coupled to an access network (wired or wirelessly)) to edge NDs, which are coupled (e.g., through one or more core NDs) to other edge NDs, which are coupled to electronic devices acting as servers. However, through compute and storage virtualization, one or more of the electronic devices operating as the NDs in FIG. 7A may also host one or more such servers (e.g., in the case of the general purpose network device 704, one or more of the software instances 762A-R may operate as servers; the same would be true for the hybrid network device 706; in the case of the special-purpose network device 702, one or more such servers could also be run on a virtualization layer executed by the processor(s) 712); in which case the servers are said to be co-located with the VNEs of that ND.

A virtual network is a logical abstraction of a physical network (such as that in FIG. 7A) that provides network services (e.g., L2 and/or L3 services). A virtual network can be implemented as an overlay network (sometimes referred to as a network virtualization overlay) that provides network services (e.g., layer 2 (L2, data link layer) and/or layer 3 (L3, network layer) services) over an underlay network (e.g., an L3 network, such as an Internet Protocol (IP) network that uses tunnels (e.g., generic routing encapsulation (GRE), layer 2 tunneling protocol (L2TP), IPSec) to create the overlay network).

A network virtualization edge (NVE) sits at the edge of the underlay network and participates in implementing the network virtualization; the network-facing side of the NVE uses the underlay network to tunnel frames to and from other NVEs; the outward-facing side of the NVE sends and receives data to and from systems outside the network. A virtual network instance (VNI) is a specific instance of a virtual network on a NVE (e.g., a NE/VNE on an ND, a part of a NE/VNE on a ND where that NE/VNE is divided into multiple VNEs through emulation); one or more VNIs can be instantiated on an NVE (e.g., as different VNEs on an ND). A virtual access point (VAP) is a logical connection point on the NVE for connecting external systems to a virtual network; a VAP can be physical or virtual ports identified through logical interface identifiers (e.g., a VLAN ID).

Examples of network services include: 1) an Ethernet LAN emulation service (an Ethernet-based multipoint service similar to an Internet Engineering Task Force (IETF) Multiprotocol Label Switching (MPLS) or Ethernet VPN (EVPN) service) in which external systems are interconnected across the network by a LAN environment over the underlay network (e.g., an NVE provides separate L2 VNIs (virtual switching instances) for different such virtual networks, and L3 (e.g., IP/MPLS) tunneling encapsulation across the underlay network); and 2) a virtualized IP forwarding service (similar to IETF IP VPN (e.g., Border Gateway Protocol (BGP)/MPLS IPVPN) from a service definition perspective) in which external systems are interconnected across the network by an L3 environment over the underlay network (e.g., an NVE provides separate L3 VNIs (forwarding and routing instances) for different such virtual networks, and L3 (e.g., IP/MPLS) tunneling encapsulation across the underlay network)). Network services may also include quality of service capabilities (e.g., traffic classification marking, traffic conditioning and scheduling), security capabilities (e.g., filters to protect customer premises from network—originated attacks, to avoid malformed route announcements), and management capabilities (e.g., full detection and processing).

Figure 7D:
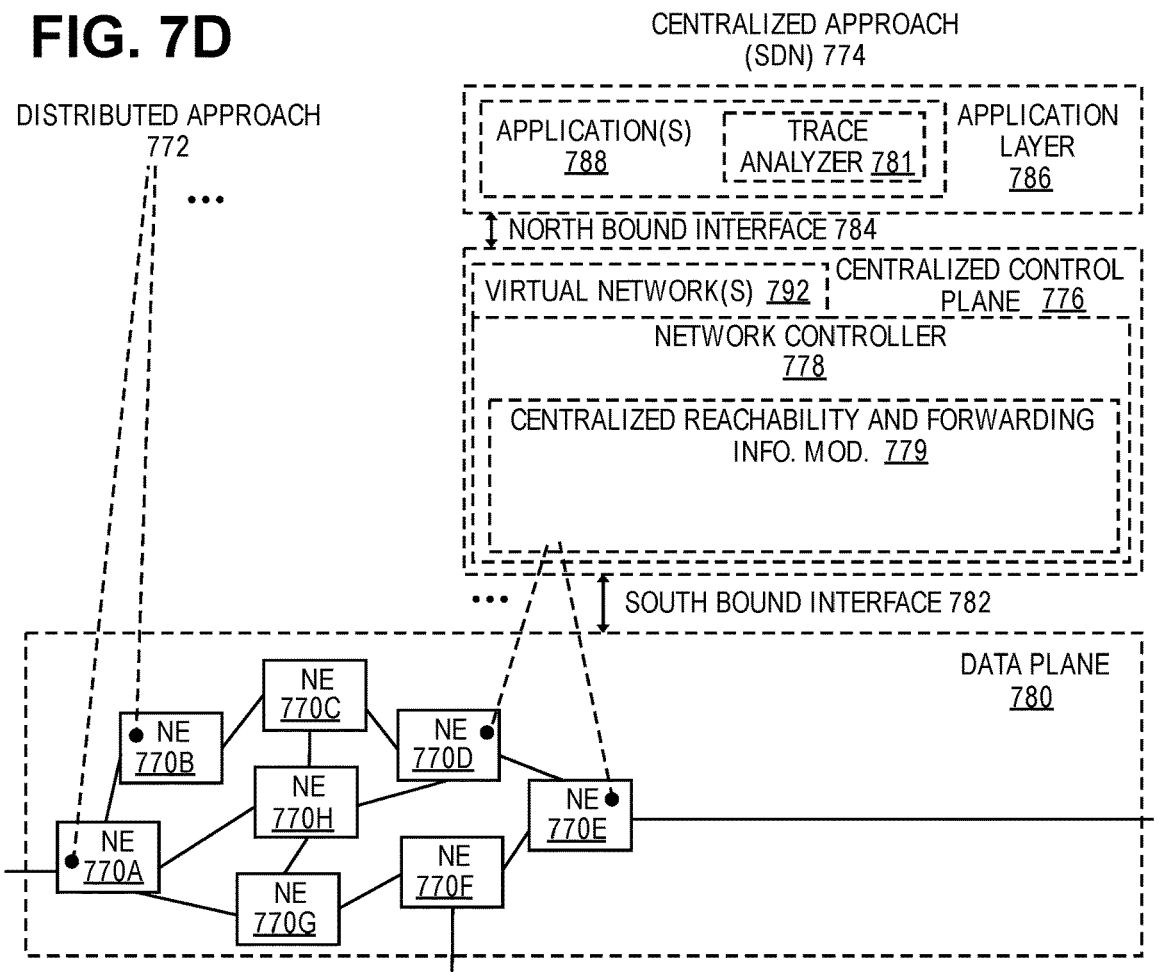
FIG. 7D illustrates a network with a single network element (NE) on each of the NDs, and within this straight forward approach contrasts a traditional distributed approach (commonly used by traditional routers) with a centralized approach for maintaining reachability and forwarding information (also called network control), according to some embodiments of the invention.

FIG. 7D illustrates a network with a single network element on each of the NDs of FIG. 7A, and within this straight forward approach contrasts a traditional distributed approach (commonly used by traditional routers) with a centralized approach for maintaining reachability and forwarding information (also called network control), according to some embodiments of the invention. Specifically, FIG. 7D illustrates network elements (NEs) 770A-H with the same connectivity as the NDs 700A-H of FIG. 7A.

FIG. 7D illustrates that the distributed approach 772 distributes responsibility for generating the reachability and forwarding information across the NEs 770A-H; in other words, the process of neighbor discovery and topology discovery is distributed.

For example, where the special-purpose network device 702 is used, the control communication and configuration module(s) 732A-R of the ND control plane 724 typically include a reachability and forwarding information module to implement one or more routing protocols (e.g., an exterior gateway protocol such as Border Gateway Protocol (BGP), Interior Gateway Protocol(s) (IGP) (e.g., Open Shortest Path First (OSPF), Intermediate System to Intermediate System (IS-IS), Routing Information Protocol (RIP), Label Distribution Protocol (LDP), Resource Reservation Protocol (RSVP) (including RSVP-Traffic Engineering (TE): Extensions to RSVP for LSP Tunnels and Generalized Multi-Protocol Label Switching (GMPLS) Signaling RSVP-TE)) that communicate with other NEs to exchange routes, and then selects those routes based on one or more routing metrics. Thus, the NEs 770A-H (e.g., the processor(s) 712 executing the control communication and configuration module(s) 732A-R) perform their responsibility for participating in controlling how data (e.g., packets) is to be routed (e.g., the next hop for the data and the outgoing physical NI for that data) by distributively determining the reachability within the network and calculating their respective forwarding information. Routes and adjacencies are stored in one or more routing structures (e.g., Routing Information Base (RIB), Label Information Base (LIB), one or more adjacency structures) on the ND control plane 724. The ND control plane 724 programs the ND forwarding plane 726 with information (e.g., adjacency and route information) based on the routing structure(s). For example, the ND control plane 724 programs the adjacency and route information into one or more forwarding table(s) 734A-R (e.g., Forwarding Information Base (FIB), Label Forwarding Information Base (LFIB), and one or more adjacency structures) on the ND forwarding plane 726. For layer 2 forwarding, the ND can store one or more bridging tables that are used to forward data based on the layer 2 information in that data. While the above example uses the special-purpose network device 702, the same distributed approach 772 can be implemented on the general-purpose network device 704 and the hybrid network device 706.

FIG. 7D illustrates that a centralized approach 774 (also known as software defined networking (SDN)) that decouples the system that makes decisions about where traffic is sent from the underlying systems that forwards traffic to the selected destination. The illustrated centralized approach 774 has the responsibility for the generation of reachability and forwarding information in a centralized control plane 776 (sometimes referred to as a SDN control module, controller, network controller, OpenFlow controller, SDN controller, control plane node, network virtualization authority, or management control entity), and thus the process of neighbor discovery and topology discovery is centralized. The centralized control plane 776 has a south bound interface 782 with a data plane 780 (sometime referred to the infrastructure layer, network forwarding plane, or forwarding plane (which should not be confused with a ND forwarding plane)) that includes the NEs 770A-H (sometimes referred to as switches, forwarding elements, data plane elements, or nodes). The centralized control plane 776 includes a network controller 778, which includes a centralized reachability and forwarding information module 779 that determines the reachability within the network and distributes the forwarding information to the NEs 770A-H of the data plane 780 over the south bound interface 782 (which may use the OpenFlow protocol). Thus, the network intelligence is centralized in the centralized control plane 776 executing on electronic devices that are typically separate from the NDs.

For example, where the special-purpose network device 702 is used in the data plane 780, each of the control communication and configuration module(s) 732A-R of the ND control plane 724 typically include a control agent that provides the VNE side of the south bound interface 782. In this case, the ND control plane 724 (the processor(s) 712 executing the control communication and configuration module(s) 732A-R) performs its responsibility for participating in controlling how data (e.g., packets) is to be routed (e.g., the next hop for the data and the outgoing physical NI for that data) through the control agent communicating with the centralized control plane 776 to receive the forwarding information (and in some cases, the reachability information) from the centralized reachability and forwarding information module 779 (it should be understood that in some embodiments of the invention, the control communication and configuration module(s) 732A-R, in addition to communicating with the centralized control plane 776, may also play some role in determining reachability and/or calculating forwarding information—albeit less so than in the case of a distributed approach; such embodiments are generally considered to fall under the centralized approach 774, but may also be considered a hybrid approach).

While the above example uses the special-purpose network device 702, the same centralized approach 774 can be implemented with the general purpose network device 704 (e.g., each of the VNE 760A-R performs its responsibility for controlling how data (e.g., packets) is to be routed (e.g., the next hop for the data and the outgoing physical NI for that data) by communicating with the centralized control plane 776 to receive the forwarding information (and in some cases, the reachability information) from the centralized reachability and forwarding information module 779; it should be understood that in some embodiments of the invention, the VNEs 760A-R, in addition to communicating with the centralized control plane 776, may also play some role in determining reachability and/or calculating forwarding information—albeit less so than in the case of a distributed approach) and the hybrid network device 706. In fact, the use of SDN techniques can enhance the NFV techniques typically used in the general-purpose network device 704 or hybrid network device 706 implementations as NFV is able to support SDN by providing an infrastructure upon which the SDN software can be run, and NFV and SDN both aim to make use of commodity server hardware and physical switches.

FIG. 7D also shows that the centralized control plane 776 has a north bound interface 784 to an application layer 786, in which resides application(s) 788. The centralized control plane 776 has the ability to form virtual networks 792 (sometimes referred to as a logical forwarding plane, network services, or overlay networks (with the NEs 770A-H of the data plane 780 being the underlay network)) for the application(s) 788. Thus, the centralized control plane 776 maintains a global view of all NDs and configured NEs/VNEs, and it maps the virtual networks to the underlying NDs efficiently (including maintaining these mappings as the physical network changes either through hardware (ND, link, or ND component) failure, addition, or removal). The applications 788 can include the trace analyzer 781 as described herein above.

While FIG. 7D shows the distributed approach 772 separate from the centralized approach 774, the effort of network control may be distributed differently or the two combined in certain embodiments of the invention. For example: 1) embodiments may generally use the centralized approach (SDN) 774, but have certain functions delegated to the NEs (e.g., the distributed approach may be used to implement one or more of fault monitoring, performance monitoring, protection switching, and primitives for neighbor and/or topology discovery); or 2) embodiments of the invention may perform neighbor discovery and topology discovery via both the centralized control plane and the distributed protocols, and the results compared to raise exceptions where they do not agree. Such embodiments are generally considered to fall under the centralized approach 774, but may also be considered a hybrid approach.

While FIG. 7D illustrates the simple case where each of the NDs 700A-H implements a single NE 770A-H, it should be understood that the network control approaches described with reference to FIG. 7D also work for networks where one or more of the NDs 700A-H implement multiple VNEs (e.g., VNEs 730A-R, VNEs 760A-R, those in the hybrid network device 706). Alternatively or in addition, the network controller 778 may also emulate the implementation of multiple VNEs in a single ND. Specifically, instead of (or in addition to) implementing multiple VNEs in a single ND, the network controller 778 may present the implementation of a VNE/NE in a single ND as multiple VNEs in the virtual networks 792 (all in the same one of the virtual network(s) 792, each in different ones of the virtual network(s) 792, or some combination). For example, the network controller 778 may cause an ND to implement a single VNE (a NE) in the underlay network, and then logically divide up the resources of that NE within the centralized control plane 776 to present different VNEs in the virtual network(s) 792 (where these different VNEs in the overlay networks are sharing the resources of the single VNE/NE implementation on the ND in the underlay network).

Figure 7E:
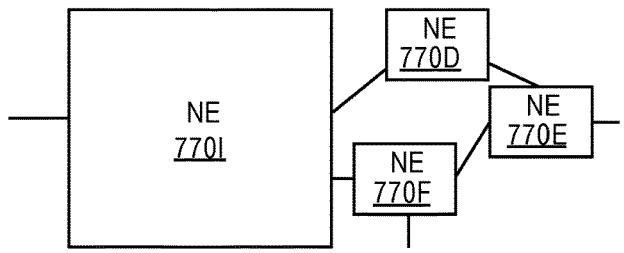
FIG. 7E illustrates the simple case of where each of the NDs implements a single NE, but a centralized control plane has abstracted multiple of the NEs in different NDs into (to represent) a single NE in one of the virtual network(s), according to some embodiments of the invention.
Figure 7F:
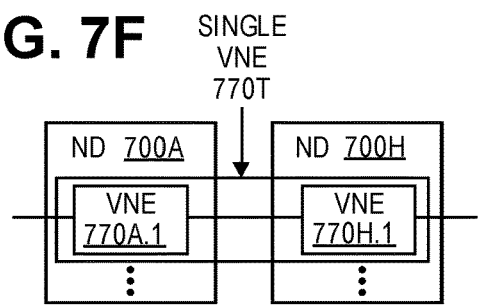
FIG. 7F illustrates a case where multiple VNEs are implemented on different NDs and are coupled to each other, and where a centralized control plane has abstracted these multiple VNEs such that they appear as a single VNE within one of the virtual networks, according to some embodiments of the invention.

On the other hand, FIGS. 7E and 7F respectively illustrate exemplary abstractions of NEs and VNEs that the network controller 778 may present as part of different ones of the virtual networks 792. FIG. 7E illustrates the simple case of where each of the NDs 700A-H implements a single NE 770A-H (see FIG. 7D), but the centralized control plane 776 has abstracted multiple of the NEs in different NDs (the NEs 770A-C and G-H) into (to represent) a single NE 7701 in one of the virtual network(s) 792 of FIG. 7D, according to some embodiments of the invention. FIG. 7E shows that in this virtual network, the NE 7701 is coupled to NE 770D and 770F, which are both still coupled to NE 770E.

FIG. 7F illustrates a case where multiple VNEs (VNE 770A.1 and VNE 770H.1) are implemented on different NDs (ND 700A and ND 700H) and are coupled to each other, and where the centralized control plane 776 has abstracted these multiple VNEs such that they appear as a single VNE 770T within one of the virtual networks 792 of FIG. 7D, according to some embodiments of the invention. Thus, the abstraction of a NE or VNE can span multiple NDs.

While some embodiments of the invention implement the centralized control plane 776 as a single entity (e.g., a single instance of software running on a single electronic device), alternative embodiments may spread the functionality across multiple entities for redundancy and/or scalability purposes (e.g., multiple instances of software running on different electronic devices).

Figure 8:
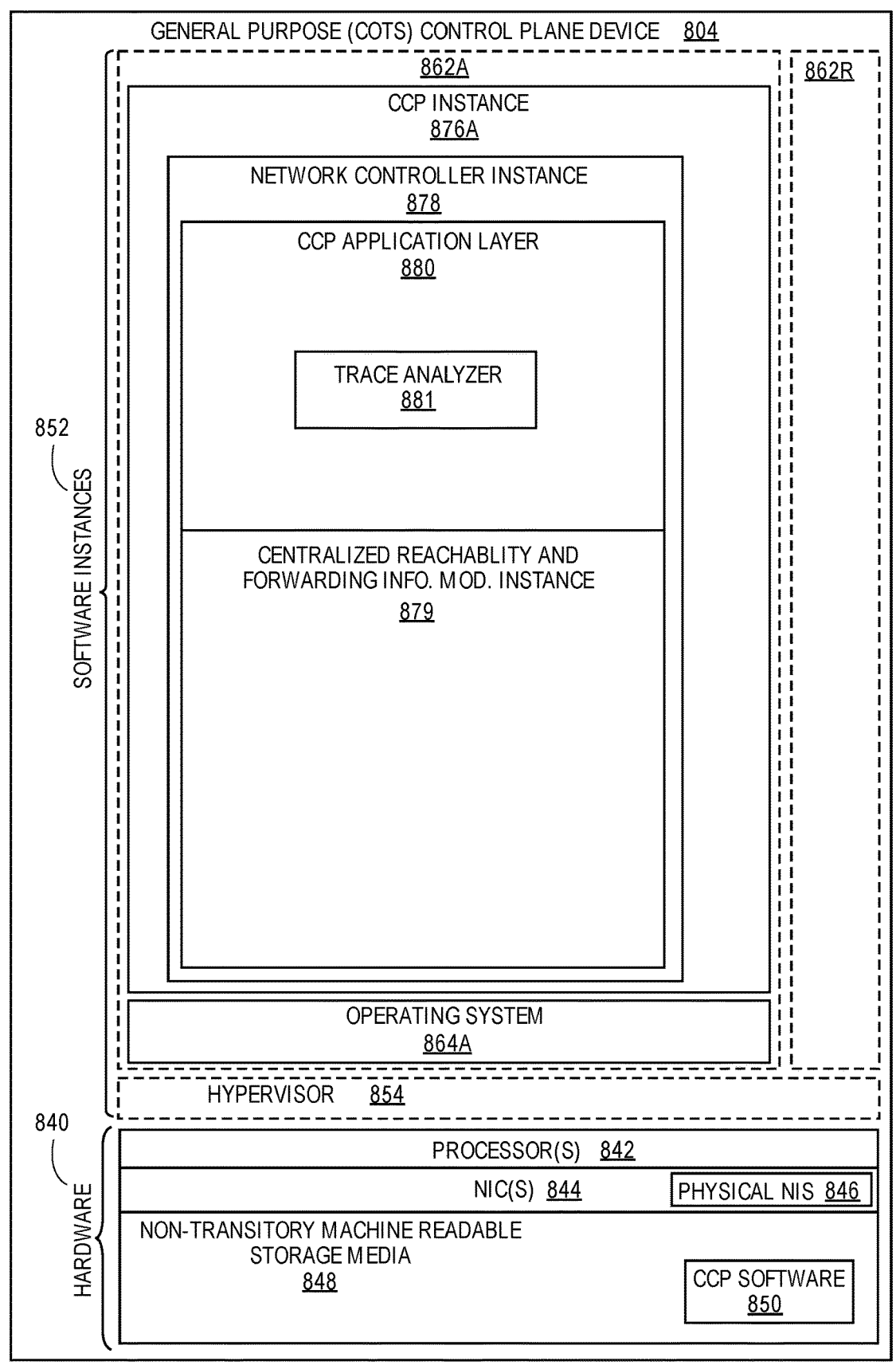
FIG. 8 illustrates a general-purpose control plane device with centralized control plane (CCP) software 850, according to some embodiments of the invention.

Similar to the network device implementations, the electronic device(s) running the centralized control plane 776, and thus the network controller 778 including the centralized reachability and forwarding information module 779, may be implemented a variety of ways (e.g., a special purpose device, a general-purpose (e.g., COTS) device, or hybrid device). These electronic device(s) would similarly include processor(s), a set or one or more physical NIs, and a non-transitory machine-readable storage medium having stored thereon the centralized control plane software. For instance, FIG. 8 illustrates, a general-purpose control plane device 804 including hardware 840 comprising a set of one or more processor(s) 842 (which are often COTS processors) and physical NIs 846, as well as non-transitory machine-readable storage media 848 having stored therein centralized control plane (CCP) software 850.

In embodiments that use compute virtualization, the processor(s) 842 typically execute software to instantiate a virtualization layer 854 (e.g., in one embodiment the virtualization layer 854 represents the kernel of an operating system (or a shim executing on a base operating system) that allows for the creation of multiple instances 862A-R called software containers (representing separate user spaces and also called virtualization engines, virtual private servers, or jails) that may each be used to execute a set of one or more applications; in another embodiment the virtualization layer 854 represents a hypervisor (sometimes referred to as a virtual machine monitor (VMM)) or a hypervisor executing on top of a host operating system, and an application is run on top of a guest operating system within an instance 862A-R called a virtual machine (which in some cases may be considered a tightly isolated form of software container) that is run by the hypervisor; in another embodiment, an application is implemented as a unikernel, which can be generated by compiling directly with an application only a limited set of libraries (e.g., from a library operating system (LibOS) including drivers/libraries of OS services) that provide the particular OS services needed by the application, and the unikernel can run directly on hardware 840, directly on a hypervisor represented by virtualization layer 854 (in which case the unikernel is sometimes described as running within a LibOS virtual machine), or in a software container represented by one of instances 862A-R). Again, in embodiments where compute virtualization is used, during operation an instance of the CCP software 850 (illustrated as CCP instance 876A) is executed (e.g., within the instance 862A) on the virtualization layer 854. In embodiments where compute virtualization is not used, the CCP instance 876A is executed, as a unikernel or on top of a host operating system, on the "bare metal" general purpose control plane device 804. The instantiation of the CCP instance 876A, as well as the virtualization layer 854 and instances 862A-R if implemented, are collectively referred to as software instance(s) 852.

In some embodiments, the CCP instance 876A includes a network controller instance 878. The network controller instance 878 includes a centralized reachability and forwarding information module instance 879 (which is a middleware layer providing the context of the network controller 778 to the operating system and communicating with the various NEs), and an CCP application layer 880 (sometimes referred to as an application layer) over the middleware layer (providing the intelligence required for various network operations such as protocols, network situational awareness, and user-interfaces). At a more abstract level, this CCP application layer 880 within the centralized control plane 776 works with virtual network view(s) (logical view(s) of the network) and the middleware layer provides the conversion from the virtual networks to the physical view. The CCP application layer 880 or similar elements can support or encompass the trace analyzer 881.

The centralized control plane 776 transmits relevant messages to the data plane 780 based on CCP application layer 880 calculations and middleware layer mapping for each flow. A flow may be defined as a set of packets whose headers match a given pattern of bits; in this sense, traditional IP forwarding is also flow-based forwarding where the flows are defined by the destination IP address for example; however, in other implementations, the given pattern of bits used for a flow definition may include more fields (e.g., 10 or more) in the packet headers. Different NDs/NEs/VNEs of the data plane 780 may receive different messages, and thus different forwarding information. The data plane 780 processes these messages and programs the appropriate flow information and corresponding actions in the forwarding tables (sometime referred to as flow tables) of the appropriate NE/VNEs, and then the NEs/VNEs map incoming packets to flows represented in the forwarding tables and forward packets based on the matches in the forwarding tables.

Standards such as OpenFlow define the protocols used for the messages, as well as a model for processing the packets. The model for processing packets includes header parsing, packet classification, and making forwarding decisions. Header parsing describes how to interpret a packet based upon a well-known set of protocols. Some protocol fields are used to build a match structure (or key) that will be used in packet classification (e.g., a first key field could be a source media access control (MAC) address, and a second key field could be a destination MAC address).

Packet classification involves executing a lookup in memory to classify the packet by determining which entry (also referred to as a forwarding table entry or flow entry) in the forwarding tables best matches the packet based upon the match structure, or key, of the forwarding table entries. It is possible that many flows represented in the forwarding table entries can correspond/match to a packet; in this case the system is typically configured to determine one forwarding table entry from the many according to a defined scheme (e.g., selecting a first forwarding table entry that is matched). Forwarding table entries include both a specific set of match criteria (a set of values or wildcards, or an indication of what portions of a packet should be compared to a particular value/values/wildcards, as defined by the matching capabilities—for specific fields in the packet header, or for some other packet content), and a set of one or more actions for the data plane to take on receiving a matching packet. For example, an action may be to push a header onto the packet, for the packet using a particular port, flood the packet, or simply drop the packet. Thus, a forwarding table entry for IPv4/IPv6 packets with a particular transmission control protocol (TCP) destination port could contain an action specifying that these packets should be dropped.

Making forwarding decisions and performing actions occurs, based upon the forwarding table entry identified during packet classification, by executing the set of actions identified in the matched forwarding table entry on the packet.

However, when an unknown packet (for example, a "missed packet" or a "match-miss" as used in OpenFlow parlance) arrives at the data plane 780, the packet (or a subset of the packet header and content) is typically forwarded to the centralized control plane 776. The centralized control plane 776 will then program forwarding table entries into the data plane 780 to accommodate packets belonging to the flow of the unknown packet. Once a specific forwarding table entry has been programmed into the data plane 780 by the centralized control plane 776, the next packet with matching credentials will match that forwarding table entry and take the set of actions associated with that matched entry.

A network interface (NI) may be physical or virtual; and in the context of IP, an interface address is an IP address assigned to a NI, be it a physical NI or virtual NI. A virtual NI may be associated with a physical NI, with another virtual interface, or stand on its own (e.g., a loopback interface, a point-to-point protocol interface). A NI (physical or virtual) may be numbered (a NI with an IP address) or unnumbered (a NI without an IP address). A loopback interface (and its loopback address) is a specific type of virtual NI (and IP address) of a NE/VNE (physical or virtual) often used for management purposes; where such an IP address is referred to as the nodal loopback address. The IP address(es) assigned to the NI(s) of a ND are referred to as IP addresses of that ND; at a more granular level, the IP address(es) assigned to NI(s) assigned to a NE/VNE implemented on a ND can be referred to as IP addresses of that NE/VNE.

While the invention has been described in terms of several embodiments, those skilled in the art will recognize that the invention is not limited to the embodiments described, can be practiced with modification and alteration within the spirit and scope of the appended claims. The description is thus to be regarded as illustrative instead of limiting.

What is claimed is:

1. A method implemented by a network device, the method to perform a trace flow process in a packet processing pipeline of the network device, the packet processing pipeline including a set of flow tables defining actions and matching criteria, the set of flow tables including a trace table and a forward table, the method comprising:
   storing by a first flow table in the set of flow tables a next destination for a trace packet into a trace register;
   forwarding the trace packet, by the first flow table, to the trace table;
   forwarding a copy of the trace packet and information on a plurality of flow tables in the set of flow tables traversed by the trace packet, by the trace table, to a trace analyzer to generate a trace, in response to the trace table determining that a trace bit is set in the trace packet;
   forwarding, by the trace table, the trace packet to the forward table; and
   determining, by the forward table, a next stage of the packet processing pipeline to forward the trace packet to, based on trace packet meta data and the next destination stored in the trace register indicating a next hop in the processing pipeline for the trace packet; and
   replacing, in a flow table of the set of flow tables, a goto command having a first destination as an operand with a goto command with the trace table as the operand and a load command to place the first destination in the trace register.

2. The method of claim 1, further comprising:
   receiving the trace packet from a controller or a marking module; and
   initiating processing of the trace packet at the first flow table of the packet processing pipeline.

3. The method of claim 1, wherein the packet processing pipeline further includes a drop table, the method further comprising:
   forwarding the trace packet to a drop table.

4. The method of claim 1, wherein the meta data in the trace packet indicates a type of the next destination for the trace packet after the forward table.

5. A network device configured to implement a method to perform a trace flow process in a packet processing pipeline of the network device, the network device comprising:
   a non-transitory machine-readable storage medium having stored therein a set of flow tables including a trace table and a forward table, the set of flow tables including flow entries having values to identify a trace packet and send the trace packet to the trace table; and
   a processor to execute a packet processing pipeline including the trace table and the forward table, the processor to store a next destination for the trace packet into a trace register, to forward the trace packet to the trace table, to forward a copy of the trace packet and information on a plurality of flow tables in the set of flow tables traversed by the trace packet to a trace analyzer in response to determining that a trace bit is set in the trace packet, to forward the trace packet to the forward table, to determine a next stage of the packet processing pipeline to forward the trace packet to, based on trace packet meta data and the next destination stored in the trace register indicating a next hop in the processing pipeline for the trace packet, and to replace in a flow table of the set of flow tables a goto command having a first destination as an operand with a goto command with the trace table as the operand and a load command to place the first destination in the trace register.

6. The network device of claim 5, wherein the processor is further configured to receive the trace packet from a controller or a marking module, and initiating processing of the trace packet at a first flow table of the packet processing pipeline.

7. The network device of claim 5, wherein the packet processing pipeline further includes a drop table, the processor further configured to execute the trace flow by forwarding the trace packet to a drop table.

8. The network device of claim 5, wherein the meta data in the trace packet indicates a type of the next destination for the trace packet after the forward table.

9. A computing device configured to execute a plurality of virtual machines, the plurality of virtual machines configured to provide network function virtualization (NFV), the plurality of virtual machines to implement a method to perform a trace flow process in a packet processing pipeline of the computing device, the computing device comprising:
   a non-transitory machine-readable storage medium having stored therein a set of flow tables including a trace table and a forward table, the set of flow tables including flow entries having values to identify a trace packet and sent the trace packet to the trace table; and
   a processor to execute the plurality of virtual machines, at least one virtual machine in the plurality of virtual machines to execute a packet processing pipeline including the trace table and the forward table, the at least one virtual machine to store a next destination for the trace packet into a trace register, to forward the trace packet to the trace table, forward a copy of the trace packet and information on a plurality of flow tables in the set of flow tables traversed by the trace packet to a trace analyzer in response to determining that a trace bit is set in the trace packet, forward the trace packet to the forward table, determine a next stage of the packet processing pipeline based on trace packet meta data and the next destination stored in the trace register indicating a next hop in the processing pipeline for the trace packet, and replace in a flow table of the set of flow tables a goto command having a first destination as an operand with a goto command with the trace table as the operand and a load command to place the first destination in the trace register.

10. The computing device of claim 9, wherein the at least one virtual machine is further configured to receive the trace packet from a controller or a marking module, and initiating processing of the trace packet at a first flow table of the packet processing pipeline.

11. The computing device of claim 9, wherein the at least one virtual machine further includes a drop table, the processor further configured to execute the trace flow by forwarding the trace packet to a drop table.

12. The computing device of claim 9, wherein the meta data in the trace packet indicates a type of the next destination for the trace packet after the forward table.

13. A control plane device configured to implement a method to perform a trace flow process in a packet processing pipeline of a network device, the control plane device comprising:
   a non-transitory machine-readable storage medium having stored therein a trace analyzer and a flow entry modifier; and a processor coupled to the non-transitory machine-readable storage medium, the processor to execute the trace analyzer, the trace analyzer to receive at least one trace packet copy from a trace table of a node in a set of nodes in a data plane of a software defined network, the trace analyzer to determine a trace across a plurality of flow tables identifying each traversed flow table in the plurality of flow tables within a packet processing pipeline based on information provided by the node with the trace packet copy, the processor to execute the flow entry modifier, the flow entry modifier to replace in a flow table of the plurality of flow tables a goto command having a first destination as an operand with a goto command with the trace table as the operand and a load command to place the first destination in a trace register.

14. The control plane device of claim 13, wherein the trace analyzer is further to determine a trace across multiple nodes in the set of nodes in the data plane.

15. The control plane device of claim 13, wherein the trace analyzer receives copies of data packets forwarded by a drop table in the set of nodes.

16. The control plane device of claim 13, wherein the trace packet copy includes meta data that indicates a next destination for an original copy of the trace packet.

17. The control plane device of claim 16, wherein the information includes a value of the trace register.

\* \* \* \* \*